US009729819B2

(12) United States Patent
Im et al.

(10) Patent No.: US 9,729,819 B2
(45) Date of Patent: Aug. 8, 2017

(54) MOBILE TERMINAL

(71) Applicant: LG ELECTRONICS INC., Seoul (KR)

(72) Inventors: Soungmin Im, Seoul (KR); Yunmi Kwon, Seoul (KR); Kiseon Lee, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/849,185

(22) Filed: Sep. 9, 2015

(65) Prior Publication Data

US 2016/0337612 A1 Nov. 17, 2016

(30) Foreign Application Priority Data

May 12, 2015 (KR) .......................... 10-2015-0066027

(51) Int. Cl.
| | |
|---|---|
| *H04M 3/42* | (2006.01) |
| *H04N 7/14* | (2006.01) |
| *H04N 5/232* | (2006.01) |
| *H04N 13/00* | (2006.01) |
| *H04N 13/02* | (2006.01) |
| *H04N 13/04* | (2006.01) |

(Continued)

(52) U.S. Cl.
CPC ............ *H04N 7/147* (2013.01); *G06F 3/011* (2013.01); *G06F 3/017* (2013.01); *G06T 19/006* (2013.01); *H04N 5/2257* (2013.01); *H04N 5/232* (2013.01); *H04N 5/23216* (2013.01); *H04N 7/142* (2013.01); *H04N 13/0048* (2013.01); *H04N 13/0239* (2013.01); *H04N 13/044* (2013.01)

(58) Field of Classification Search
USPC ...................................................... 455/414.1
See application file for complete search history.

(56) References Cited

U.S. PATENT DOCUMENTS

| | | |
|---|---|---|
| 2004/0189849 A1 | 9/2004 | Hofer |
| 2009/0021576 A1 | 1/2009 | Linder et al. |
| | (Continued) | |

FOREIGN PATENT DOCUMENTS

CN 103873758 A 6/2014

OTHER PUBLICATIONS

Ochi et al., "Live Streaming System for Omnidirectional Video," IEEE Virtual Reality Conference, Arles, France, Mar. 23-27, 2015 (retrieved on Mar. 1, 2015), pp. 349-350, XP55295163.

(Continued)

*Primary Examiner* — Maria El-Zoobi
(74) *Attorney, Agent, or Firm* — Birch, Stewart, Kolasch & Birch, LLP

(57) ABSTRACT

A mobile terminal including a camera; a display; a wireless communication unit; and a controller configured to control the wireless communication unit to transmit a first signal requesting a video call to provide a virtual reality (VR) image to an external device, the VR image having an angle of view equal to or greater than a preset degree, generate the VR image based on a plurality of images obtained using the camera, control the wireless communication unit to receive a preset second signal from the external device, and control the wireless communication unit to transmit a third signal including the generated VR image to the external device in response to the second signal.

19 Claims, 26 Drawing Sheets

(51) Int. Cl.
*G06T 19/00* (2011.01)
*H04N 5/225* (2006.01)
*G06F 3/01* (2006.01)

(56) References Cited

U.S. PATENT DOCUMENTS

| | | |
|---|---|---|
| 2010/0054627 A1 | 3/2010 | Rosenberg |
| 2010/0304720 A1* | 12/2010 | Lucero ............... H04N 1/00127 455/414.1 |
| 2011/0037712 A1* | 2/2011 | Kim .................... H04M 1/7253 345/173 |
| 2013/0033483 A1* | 2/2013 | Im ........................ G06F 3/0482 345/419 |
| 2015/0042852 A1* | 2/2015 | Lee ...................... H04N 5/2258 348/262 |
| 2015/0055937 A1 | 2/2015 | Van Hoff et al. |
| 2016/0238236 A1* | 8/2016 | Im ....................... F21V 33/0052 |
| 2016/0260086 A1* | 9/2016 | Cho .................. G06Q 20/3278 |

OTHER PUBLICATIONS

Qin et al., "On-Demand Sharing of a High-Resolution Panorama Video from Networked Robotic Cameras," Proceedings of the 2007 IEEE/RSJ International Conference on Intelligent Robots and Systems, San Diego, CA, USA, Oct. 29,-Nov. 2, 2007, pp. 3113-3118, XP031222254.

* cited by examiner

FIG. 5
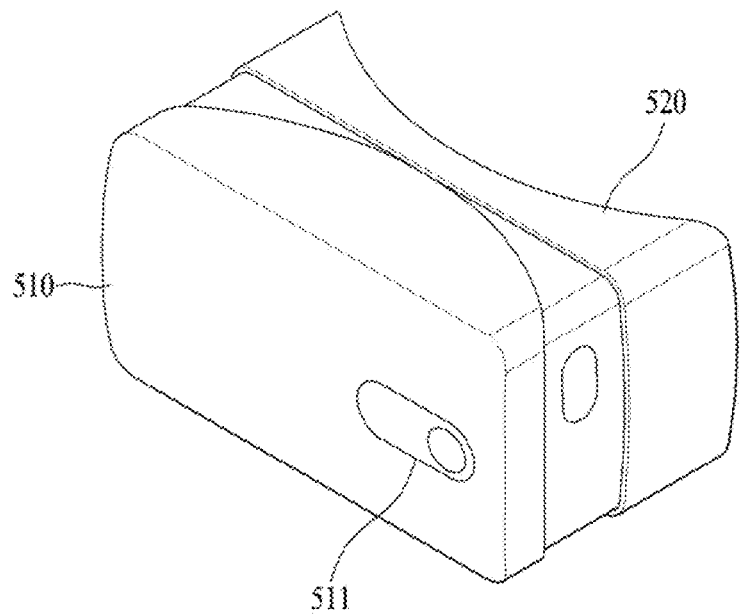
(a)
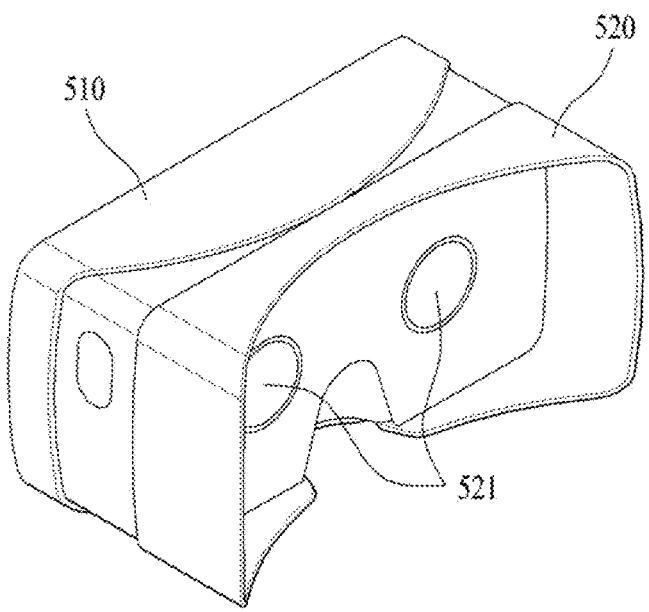
(b)

FIG. 6
[Transmitting side]
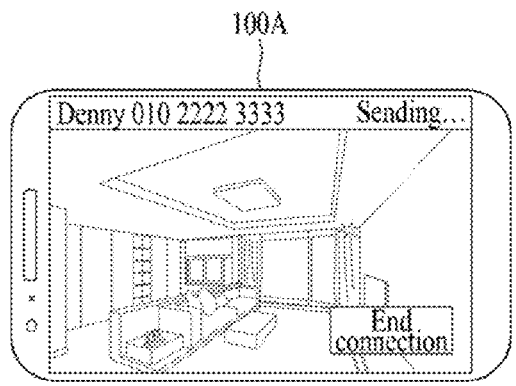
(a)
[Receiving side]
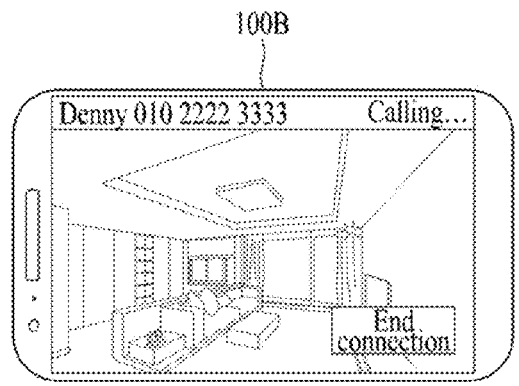
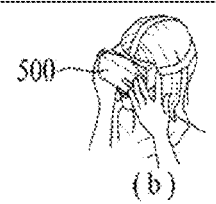
(b)
FIG. 7
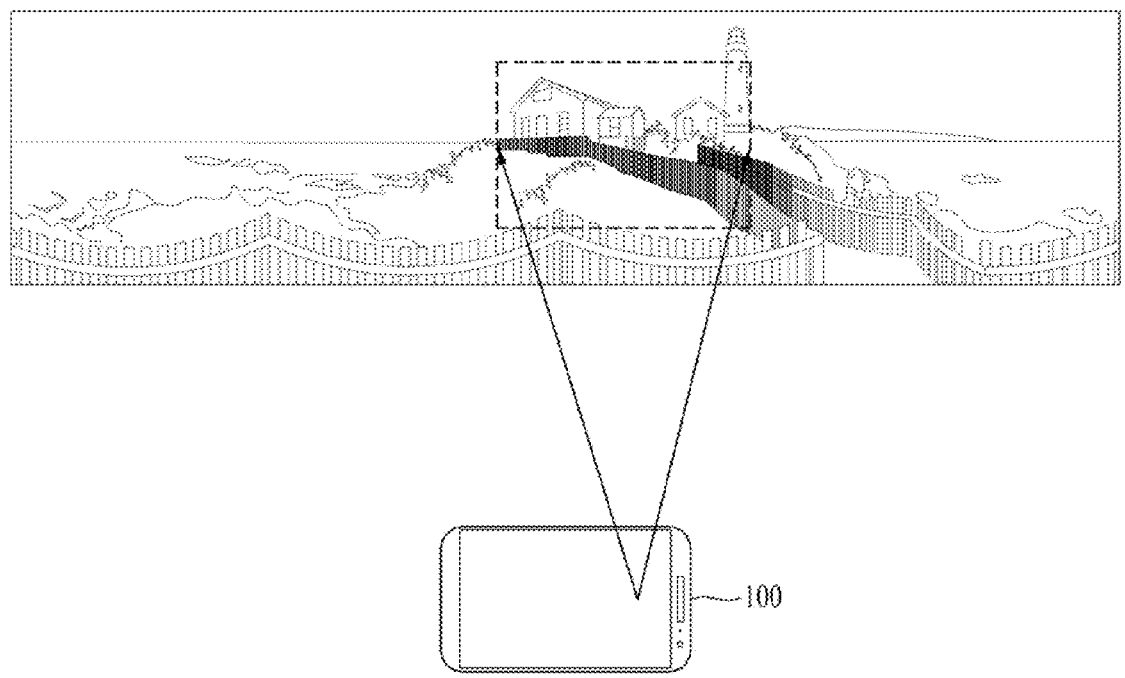

(a)  (b)

(a)  (b)

MOBILE TERMINAL

CROSS-REFERENCE TO RELATED APPLICATIONS

This application claims priority to Korean Patent Application No. 10-2015-0066027 filed on May 12, 2015 in Korea, the entire contents of which is hereby incorporated by reference in its entirety.

BACKGROUND OF THE INVENTION

Field of the Invention

The present invention relates to a mobile terminal. Although the present invention is suitable for a wide scope of applications, it is particularly suitable for facilitating the use of a terminal in further consideration of user's convenience.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, a technology for enabling a user to experience virtual reality by mounting a mobile terminal in a virtual reality (VR) device has been gradually provided. However, there are problems that a user may watch a content made only for VR using the VR device only and that the number of VR dedicated contents is insignificant so far.

SUMMARY OF THE INVENTION

Accordingly, an object of the present invention is to address the above-noted and other problems.

One object of the present invention is to provide a mobile terminal, by which a solution for a user of the mobile terminal to easily make a VR content is provided.

Another object of the present invention is to provide a mobile terminal, by which a solution for enabling an interaction between a transmitting side of making and transmitting a VR content and a receiving side of receiving and watching the VR content is provided.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a camera, a wireless communication unit and a controller controlling the wireless communication unit to transmit a first signal requesting a video call to provide a virtual reality (VR) image to an external device, the VR image having an angle of view equal to or greater than a preset degree, the controller generating the VR image based on a plurality of images obtained using the camera, the controller controlling the wireless communication unit to receive a preset second signal from the external device, the controller controlling the wireless communication unit to transmit a third signal including the generated VR image to the external device in accordance with the second signal.

In another aspect of the present invention, a mobile terminal according to an embodiment of the present invention may include a wireless communication unit, a display unit and a controller controlling the wireless communication unit to receive a first signal requesting a video call to provide a virtual reality (VR) image from an external device, the VR image having an angle of view equal to or greater than a preset degree, the controller controlling the wireless communication unit to transmit a third signal granting the video call to provide the VR image in accordance with a second signal indicating a connection between the mobile terminal and a VR device to the external device, the controller controlling the wireless communication unit to receive a fourth signal including the VR image from the external device, the controller displaying the VR image included in the fourth signal on the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 5 is a diagram illustrating one example of a VR device connected to a receiving side mobile terminal according to one embodiment of the present invention;

FIG. 6 is a diagram illustrating one example of a method for a transmitting side mobile terminal to provide a VR image to a receiving side mobile terminal according to one embodiment of the present invention;

FIG. 7 is a diagram illustrating one example of a VR image used to experience virtual reality through a VR device according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
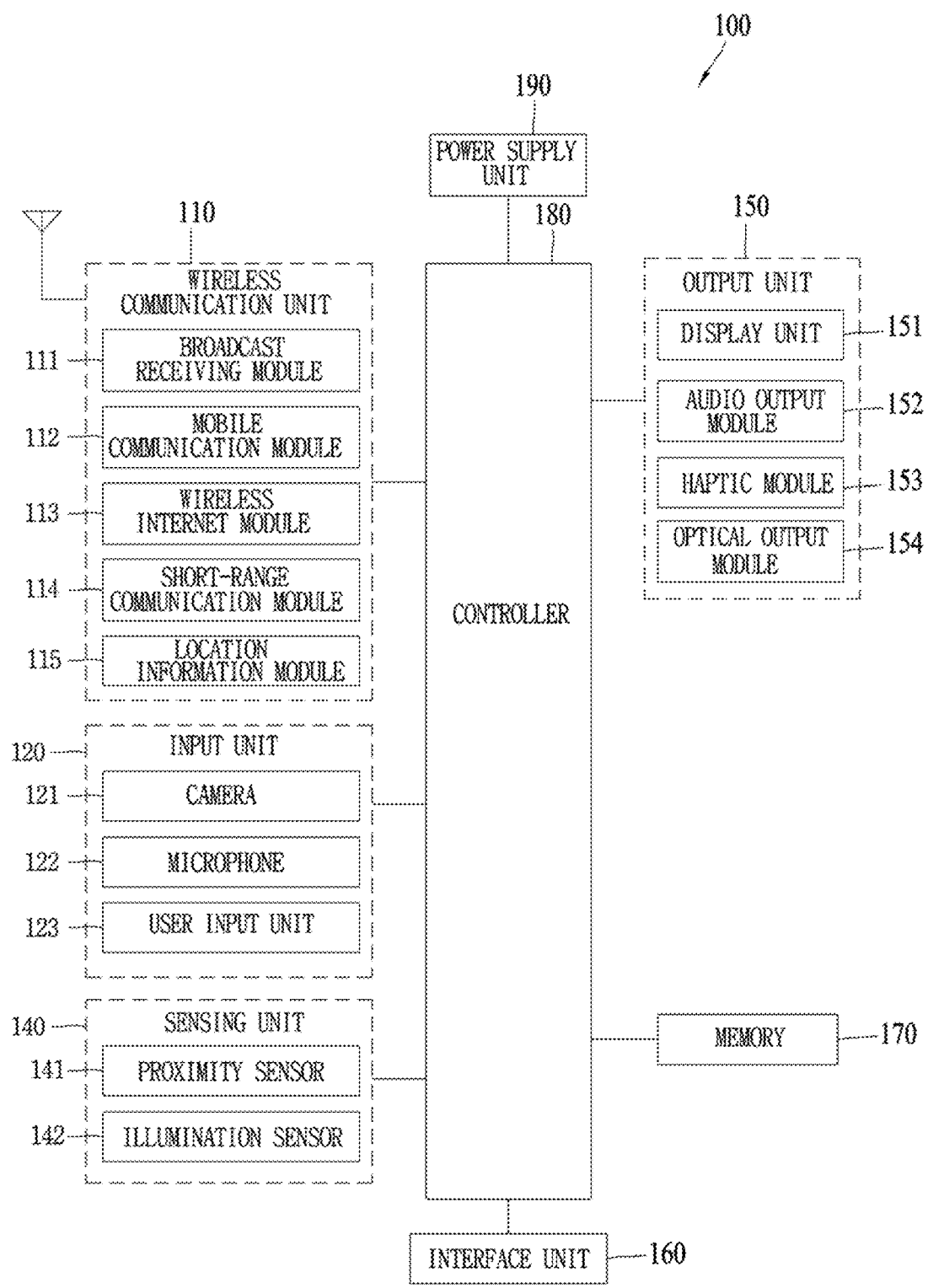
FIG. 1A is a block diagram of a mobile terminal in accordance with the present disclosure.
Figure 1B:
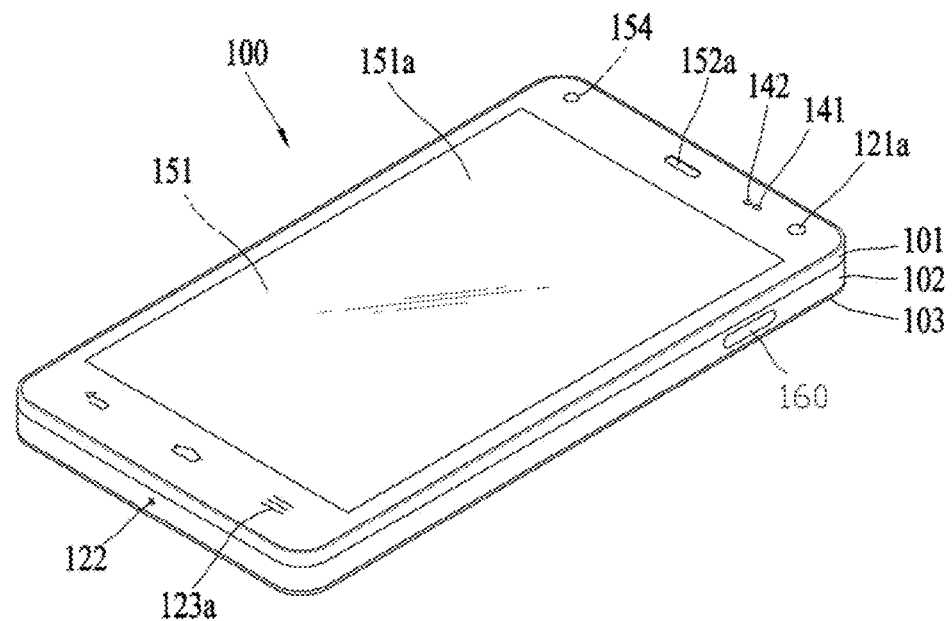
FIGS. 1B and 1C are conceptual views of one example of the mobile terminal, viewed from different directions.
Figure 1C:
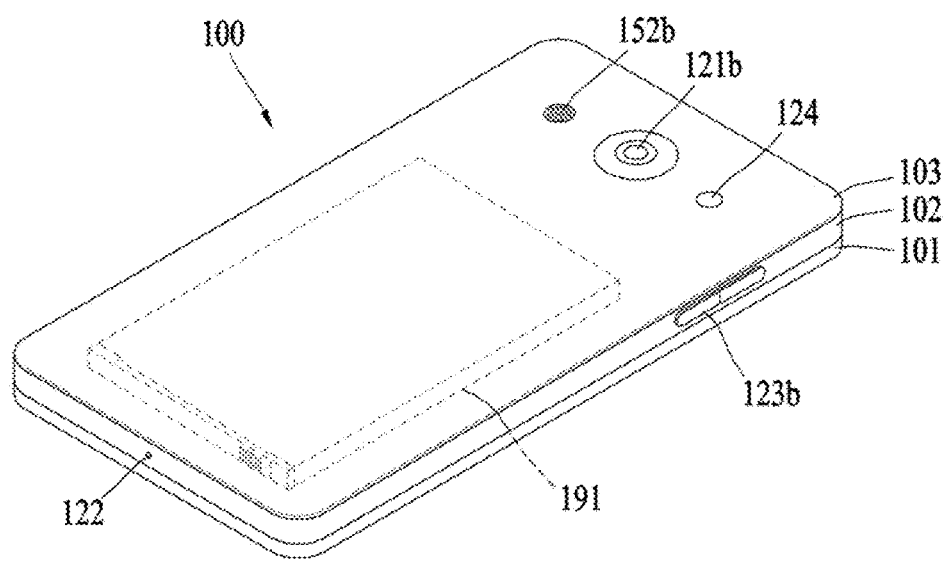

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
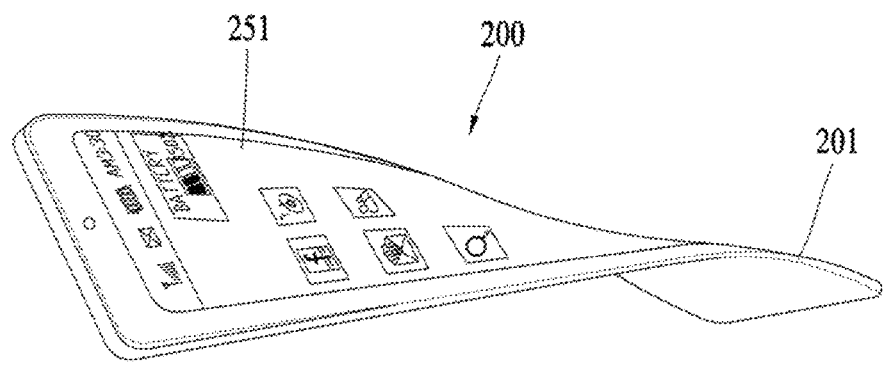
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like. In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
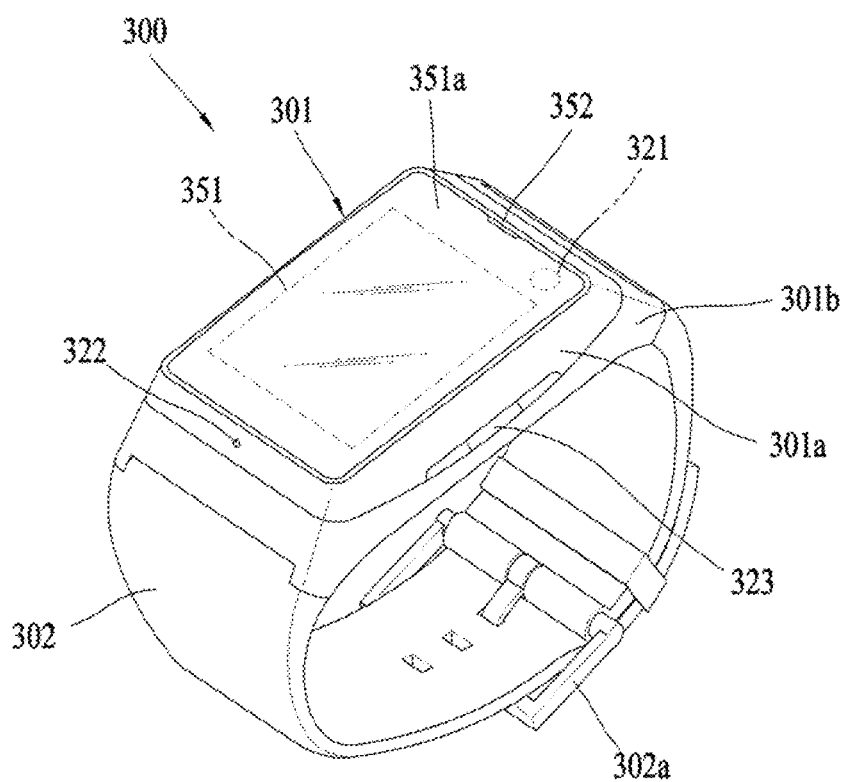
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
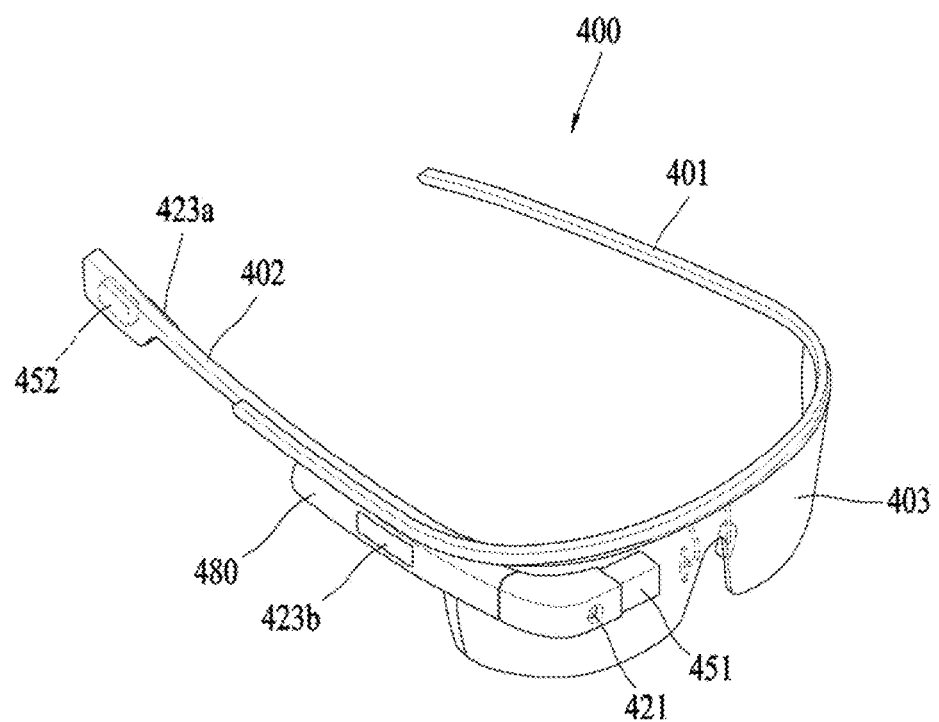
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like. The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Moreover, although the embodiments of the present invention are described in case of a mobile terminal corresponding to, for example, the mobile terminal 100 as shown in FIGS. 1A to 1C, the mobile terminal may corresponds to at least one of the mobile terminal 200 in FIG. 2, the mobile terminal 300 in FIG. 3 and the mobile terminal 400 in FIG. 4, depending on an embodiment.

According to one embodiment of the present invention, a prescribed one of the two mobile terminals 100 provides a VR image and the other mobile terminal 100 can receive the VR image. For clarity, the mobile terminal 100 providing the VR image is named a first mobile terminal 100 or a transmitting side mobile terminal 100 and the mobile terminal 100 receiving the VR image is named a second mobile terminal 100 and a receiving side mobile terminal 100.

In this instance, the VR image corresponds to an image that has an angle of view equal to or greater than a preset degree. Alternatively, depending on an embodiment, the VR image may correspond to an image that has the angle of view equal to or greater than the preset degree and a depth recognized (perceived) by a user. The depth can be recognized (perceived) through eyes of a user in a manner that the VR image is rendered as a three-dimensional image. The VR image may correspond to one of a still image and video image. In some cases, the VR image may be named a VR content. Moreover, the angle of view of the VR image is generally greater than that of the camera 121 built in the mobile terminal 100 and can be equal to or greater than, for example, 110 degrees.

The receiving side mobile terminal 100 can display the VR image on the display unit 151 in a situation of being mounted in a separate VR device. The receiving side mobile terminal 100 can be directly mounted in the VR device when the display unit is not included in the VR device. And, the receiving side mobile terminal 100 can be connected to the VR device via wire/wireless.

FIG. 5 is a diagram illustrating one example of a VR device connected to a receiving side mobile terminal according to one embodiment of the present invention. According to one embodiment of the present invention, a VR device 500 includes a first case 510 and a second case 520. The VR device 500 can further include a band to be worn on a head of a user.

The first case 510 can be separated from the second case 520 at least in part. The first case 510 can internally include a loading part capable of loading the mobile terminal 100. The mobile terminal 100 can be arranged so that the rear side of the mobile terminal 100 is close to the first case 510 and the front side of the mobile terminal 100 is close to the second case 520. The first case 510 can have a hole 511 for exposing a rear camera 121 of the mobile terminal 100 in a situation that the mobile terminal 100 is mounted in the VR device 500. Depending on an embodiment, the first case 510 includes a port for connecting the mobile terminal 100.

The second case 520 is the part touched with a head of a user when the user wears the VR device 500. The second case 520 includes lenses 521 corresponding to eyes of a user when the user wears the VR device 500 on the head. For instance, the lenses 521 may be implemented by including a fisheye lens, a wide-angle lens and the like in order to enhance a field of view of a user.

Depending on an embodiment, the second case 520 can have a proximity sensor on the part touched with the head of a user when the user wears the VR device 500. Using the proximity sensor, the VR device 500 can determine whether the user wears the VR device 500. Moreover, based on whether the band is pulled and the strength of the pulling band, the VR device 500 can determine whether the user wears the VR device 500.

The VR device 500 includes a sensing unit containing a gyroscope sensor, a motion sensor and the like. The VR device 500 can determine a movement, location or rotation of the head of the user wearing the VR device 500 and the degree of the movement, location or rotation based on sensed data provided by the sensing unit.

Moreover, depending on an embodiment, the VR device 500 includes an eye tracking module for tracking eyes of a user wearing the VR device 500. For instance, the eye tracking module includes a camera for obtaining an image of eyes of a user and an IR sensor for radiating infrared light on eyes of a user. The VR device 500 may track the eyes of the user by determining a location and movement of a dot shown in the eyes of the user by the radiated infrared light based on the image obtained by the camera.

Furthermore, depending on an embodiment, the VR device 500 may further include a user interface unit for receiving a user command. For instance, a touch pad for receiving a touch command of a user may be provided on an exterior side surface of the second case 520.

FIG. 6 is a diagram illustrating one example of a method for a transmitting side mobile terminal to provide a VR image to a receiving side mobile terminal according to one embodiment of the present invention. In the present embodiment, a transmitting side mobile terminal 100 is referred to as a first mobile terminal 100A and a receiving side mobile terminal 100 is referred to as a second mobile terminal 100B.

Referring to FIG. 6(a), the first mobile terminal 100A generates a VR image. A method of generating a VR image shall be described later in detail with reference to FIG. 10 and later drawings. The first mobile terminal 100A transmits a first signal for requesting a video call for providing the VR image to the second mobile terminal 100B. Depending on an embodiment, the first signal may be transmitted from the first mobile terminal 100A to the second mobile terminal 100B through a communication provider server. After having transmitted the first signal to the second mobile terminal 100B, the first mobile terminal 100A can generate the VR image.

Referring to FIG. 6(b), the second mobile terminal 100B can receive the first signal. If a user of the second mobile terminal 100B receives the video call for providing the VR image from the first mobile terminal, the user of the second mobile terminal 100B mounts the second mobile terminal 100B in the VR device 500 and wears the VR device 500 having the second mobile terminal 100B mounted therein. If the second mobile terminal 100B is completely mounted in the VR device 500, the second mobile terminal 100B can transmit a second signal for connecting the video call to the first mobile terminal 100A. Alternatively, depending on an embodiment, the second mobile terminal 100B can transmit the second signal to the first mobile terminal 100A immediately after granting the connection request. And, the second mobile terminal 100B can transmit the second signal to the first mobile terminal 100A after granting the connection request in a situation that the user of the second mobile terminal 100B attempts to wear the VR device 500 or is wearing the VR device 500.

The second mobile terminal 100B can determine that the second mobile terminal 100B is mounted in the VR device 500 in the following cases. First, a connection to the VR device 500 is detected by the interface unit 160. Second, a preset signal is transmitted from the VR device 500 to the second mobile terminal 100B. Third, a preset command is input from the user of the second mobile terminal 100B.

If receiving the second signal from the second mobile terminal 100B, the first mobile terminal can transmit the generated VR image to the second mobile terminal 100B. In this instance, the first mobile terminal 100A converts the generated image into a left eye image and a right eye image and may transmit the converted VR image to the second mobile terminal 100B. Moreover, the first mobile terminal 100A can transmit a depth information of the VR image to the second mobile terminal together as well.

The second mobile terminal 100B partitions the display unit 151 into a left eye display region and a right eye display region. Moreover, the second mobile terminal can output the left eye VR image transmitted from the first mobile terminal 100A through the left eye display region and the right eye VR image transmitted from the first mobile terminal 100A through the right eye display region. In this instance, the second mobile terminal 100B can enable the VR image to be recognized to have an appropriate depth through eyes of the user wearing the VR device 500, based on the depth information transmitted from the first mobile terminal 100A.

Since the VR image displayed through the second mobile terminal 100B is distorted by the lenses 521 provided in the VR device 500, a field of view (FOV) of the user of the second mobile terminal can become wide. According to the present embodiment, the user of the second mobile terminal 100B can experience virtual reality as if being actually in a location in which a user of the first mobile terminal 100A is photographing an image.

FIG. 7 is a diagram illustrating one example of a VR image used to experience virtual reality through a VR device according to one embodiment of the present invention. In order to experience virtual reality using the VR device 500, it uses not a general image (or content) but a VR image (or VR content). In particular, in order for a user wearing the VR device 500 to have a sense of reality and space as if the user is actually in a location, the VR image having an angle of view equal to or greater than 110 degrees approximately is used. In general, the VR image can be generated by matching pictures taken from multiple angles using multiple cameras with each other. Alternatively, a picture taken using a camera with a fisheye lens or an optical lens may be utilized as the VR image.

According to one embodiment of the present invention, a method of generating a VR image using an image photographed through the camera 121 of the mobile terminal 100 without a separate apparatus is provided. However, a user has a limitation of experiencing virtual reality through the VR device 500 using the image obtained by the camera 121 only since the camera 121 built in the mobile terminal 100 does not have a wide angle of view. Therefore, it is preferable to generate the VR image having the angle of view equal to or greater than a preset degree using the camera 121 of the mobile terminal 100.

Figure 8:
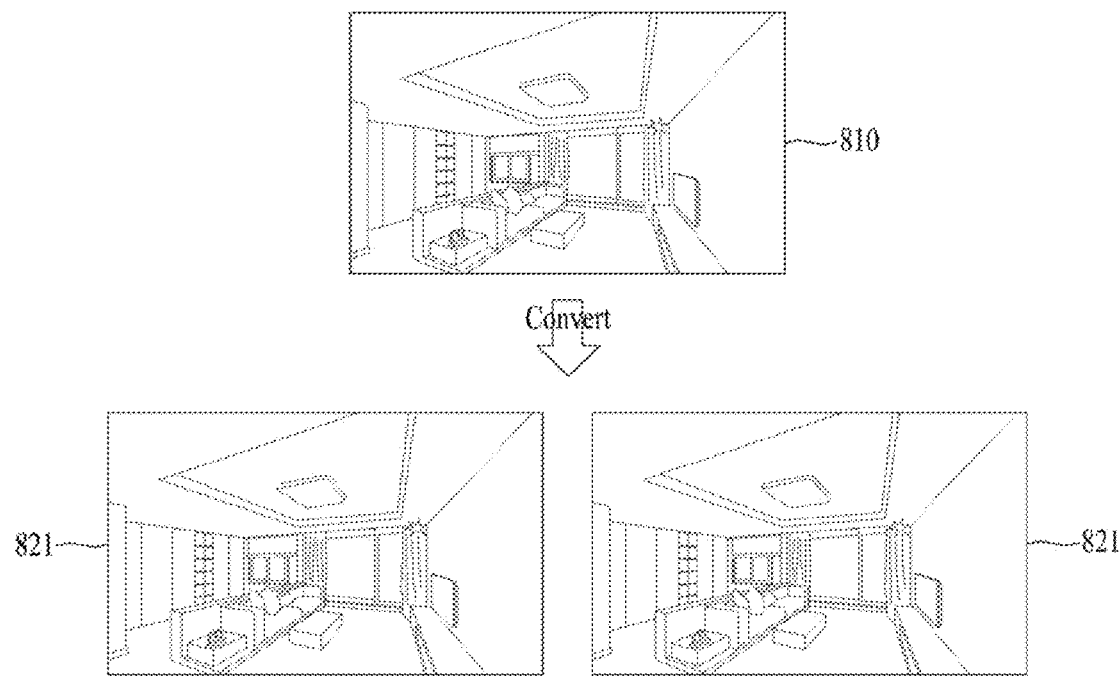
FIG. 8 is a diagram illustrating one example of a method for a first mobile terminal to transmit a VR image to a second mobile terminal according to one embodiment of the present invention.

FIG. 8 is a diagram illustrating one example of a method for a first mobile terminal to transmit a VR image to a second mobile terminal according to one embodiment of the present invention. As mentioned in the foregoing description with reference to FIG. 6, according to one embodiment of the present invention, the first mobile terminal 100A transmits the VR image to the second mobile terminal 100B. In this instance, the first mobile terminal 100A can convert the VR image and then transmit the converted VR image to the second mobile terminal 100B in order to enable a user wearing the VR device 500, in which the second mobile terminal 100B is mounted, to experience virtual reality through a three-dimensional effect.

The first mobile terminal 100A can convert a VR image 810 into a left eye VR image 821 and a right eye VR image 820 and then transmit the converted images 821 and 822 to the second mobile terminal 100B. The first mobile terminal 100A can transmit a depth information of the VR image 810 to the second mobile terminal 100B together.

For instance, the first mobile terminal 100A can extract the depth information using a disparity between the objects identical to each other included in images when the images are photographed in a manner that a location of the camera 121 is changed. And, the first mobile terminal 100A can extract the depth information based on whether a signal radiated from an infrared sensor provided in the first mobile terminal 100A is delayed. Moreover, the first mobile terminal 100A can extract the depth information using a depth camera included in the first mobile terminal 100A separately.

The second mobile terminal 100B can appropriately shift the VR images 821 and 822 transmitted from the first mobile terminal 100A based on the depth information and then output the shifted VR images 821 and 822 through the display unit 151. Alternatively, the second mobile terminal 100B can perform rendering on the VR images 821 and 822 transmitted from the first mobile terminal 100A based on the depth information and then output the rendered VR images 821 and 822 through the display unit 151. In the second mobile terminal 100B, the left eye VR image 821 can be output to a left eye display region and the right eye VR image 822 can be output to a right eye display region. The user wearing the VR device 500 can feel sense of distance in accordance with a location of an image focused in a manner that the left eye VR image 821 and the right eye VR image 822 are combined with each other.

Figure 9:
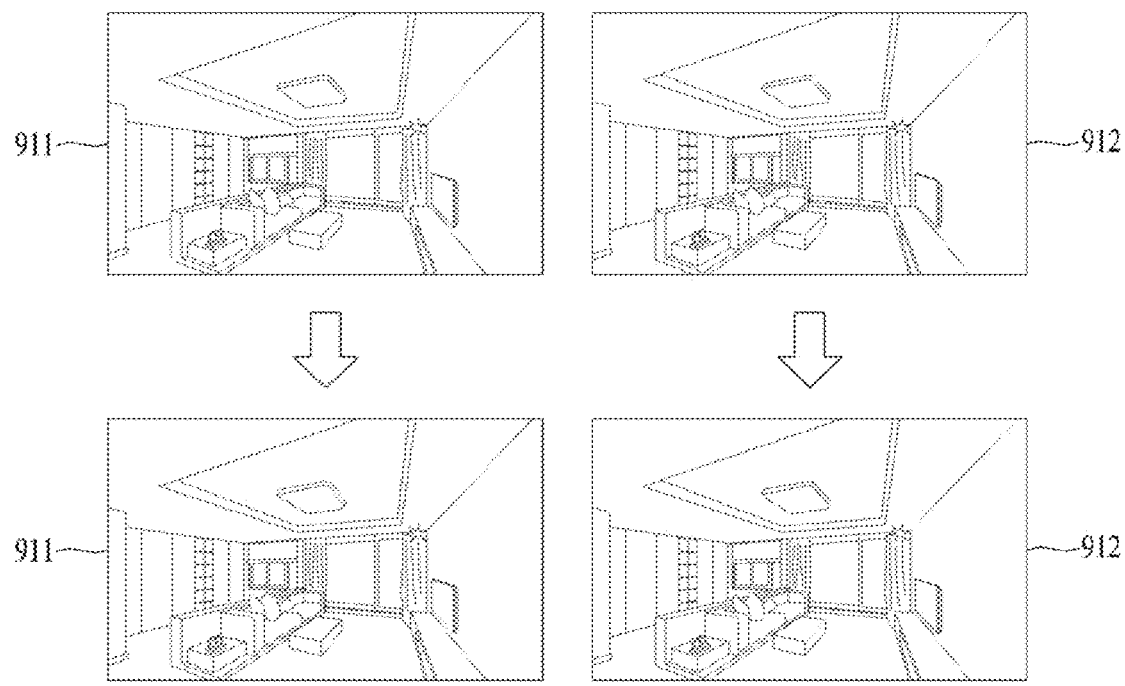
FIG. 9 is a diagram illustrating another example of a method for a first mobile terminal to transmit a VR image to a second mobile terminal according to one embodiment of the present invention.

Next, FIG. 9 is a diagram illustrating another example of a method for a first mobile terminal to transmit a VR image to a second mobile terminal according to one embodiment of the present invention. As mentioned in the foregoing description with reference to FIG. 6, according to one embodiment of the present invention, the first mobile terminal 100A transmits the VR image to the second mobile terminal 100B.

In the present embodiment, assume two cameras 121 are provided in the first mobile terminal 100A in order to correspond to distance between two eyes of a user and VR images are generated using the two cameras 121, respectively. The first mobile terminal 100A transmits a first VR image 911 obtained using a first camera 121 and a second VR image 912 obtained using a second camera 121 to the second mobile terminal 100B. Assume that the first camera 121 is provided in the first mobile terminal 100A at a location corresponding to left eye of a user and the second camera 121 is provided in the first mobile terminal 100A at a location corresponding to right eye of a user.

The second mobile terminal 100B can output the first VR image 911 transmitted from the first mobile terminal 100A to the left eye display region and the second VR image 912 transmitted from the first mobile terminal 100A to the right eye display region. Since the first camera 121 and second camera 121 are located in a manner that the distance between the above two cameras corresponds to the distance between two eyes of the user, the user wearing the VR device 500 can feel sense of distance from the first VR image 911 and second VR image 912.

Figure 10:
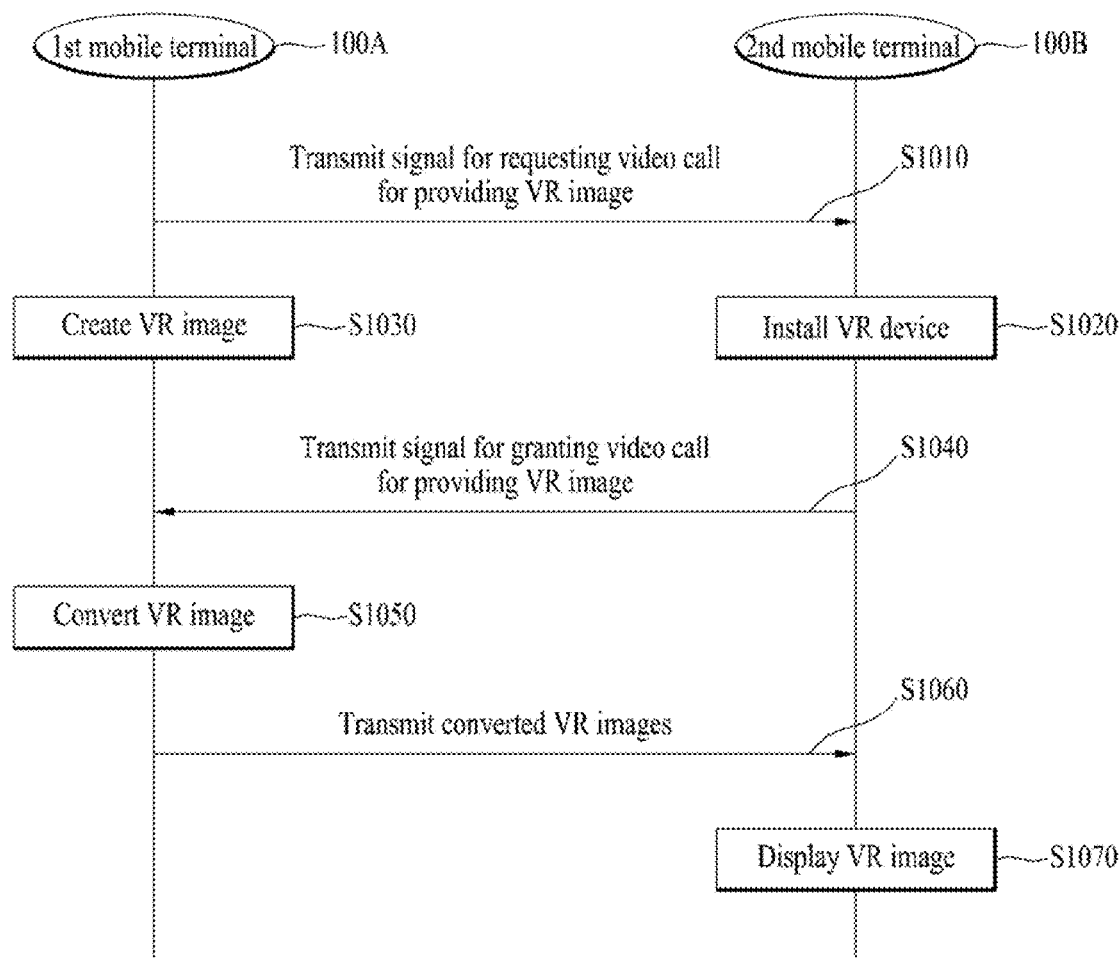
FIG. 10 is a diagram illustrating one example of a method for transmitting a VR image from a first mobile terminal to a second mobile terminal according to one embodiment of the present invention.

FIG. 10 is a diagram illustrating one example of a method for transmitting a VR image from a first mobile terminal to a second mobile terminal according to one embodiment of the present invention. The controller 180 of the first mobile terminal 100A transmits a first signal for requesting a video call for providing a VR image to the second mobile terminal 100B through the wireless communication unit 110 (S1010). The first signal includes a call signal for requesting the video call for providing the VR image and a signal (e.g., signal corresponding to a text message) for informing of a request for the vide call for providing the VR image except the call signal.

If the controller 180 of the second mobile terminal 100B detects the first signal through the wireless communication unit 110, the controller 180 of the second mobile terminal 100B can output data corresponding to the first signal. For instance, the controller 180 of the second mobile terminal 100B can output video data corresponding to the first signal to the display unit 151, audio data corresponding to the first signal on the audio output unit 152, and vibration data corresponding to the first signal to the haptic module 153. For example, when the first signal includes a call signal, the controller 180 of the second mobile terminal 100B can display a screen used for receiving a call on the display unit 151.

The video data output to the display unit 151 of the second mobile terminal 100B includes a guide message for guiding a user of the second mobile terminal 100B to wear the VR device 500. The user of the second mobile terminal 100B connects the second mobile terminal 100B to the VR device 500 and then wears the VR device 500 on their head (S1020). The controller 180 of the second mobile terminal 100B can detect that the second mobile terminal 100B has been connected to the VR device 500. For instance, the controller 180 of the second mobile terminal 100B can detect that the second mobile terminal 100B has been connected to the VR device 500 in the following cases. First, a preset signal that the user of the second mobile terminal 100B inputs after connecting the second mobile terminal 100B to the VR device 500 is detected. Second, a connection to the VR device 500 is detected by the interface unit 160. Third, a preset signal is received from the VR device 500.

Meanwhile, the controller 180 of the first mobile terminal 100A generates the VR image (S1030). After having transmitted the first signal to the second mobile terminal 100B, the controller 180 of the first mobile terminal 100A can generate the VR image. The controller 180 of the first mobile terminal 100A can generate the VR image by matching a plurality of images obtained by the camera 121 with each other. Since the user of the second mobile terminal 100B has a limitation of experiencing virtual reality using the angle of view of the camera 121 only, the VR image having the angle of view equal to or greater than a preset degree should be generated by matching a plurality of the images obtained using the camera 121 with each other. A method of generating a VR image will be described in more detail with reference to FIGS. 12 to 16.

The generated VR image includes a dynamic image obtained by real time (or in each preset time) by the camera 121 and a static image obtained by the camera 121. Depending on an embodiment, the dynamic image may be processed to have a depth recognized by a user. If detecting that the second mobile terminal 100B is connected to the VR device 500, the controller 180 of the second mobile terminal 100B can transmit a second signal for granting the video call for providing the VR image to the first mobile terminal 100A through the wireless communication unit 110 (S1040). The second signal includes an information indicating that the second mobile terminal 100B has been completely connected to the VR device 500.

Depending on an embodiment, the second mobile terminal 100B can transmit the second signal to the first mobile terminal 100A before the step of installation of the VR device (S1020) by including information indicating that a user is wearing the VR device 500 despite granting the video call for providing the VR image in the second signal. After having received the second signal or transmitted the first signal, the first mobile terminal 100A can generate the VR image and then convert the generated VR image. And, the first mobile terminal 100A can transmit the converted VR image to the second mobile terminal 100B in accordance with receiving a signal for indicating that the VR device installation has been completed from the second mobile terminal 100B.

The second signal includes a signal for granting the video call for providing the VR image if the first signal includes the call signal. And the second signal includes a signal for requesting the video call for providing the VR image if the first signal includes a preset signal except the call signal. The controller 180 of the first mobile terminal 100A converts the VR image into a left eye VR image and a right eye VR image in accordance with the second signal (S1050) and then transmits the converted VR images to the second mobile terminal 100B through the wireless communication unit 110 (S1060).

The controller 180 of the second mobile terminal 100B receives the VR images through the wireless communication unit 110, partitions the display unit 151 into a left eye display region and a right eye display region, and then outputs the left eye VR image to the left eye display region and the right eye VR image to the right eye display region (S1070). The user of the second mobile terminal 100B can feel senses of space and distance by watching the VR images output to the display unit 151 of the second mobile terminal 100B through the lenses 521 of the VR device 500. Thus, the user of the second mobile terminal 100B can experience virtual reality as if being actually in a location in which a user of the first mobile terminal 100A is photographing an image.

Figure 11:
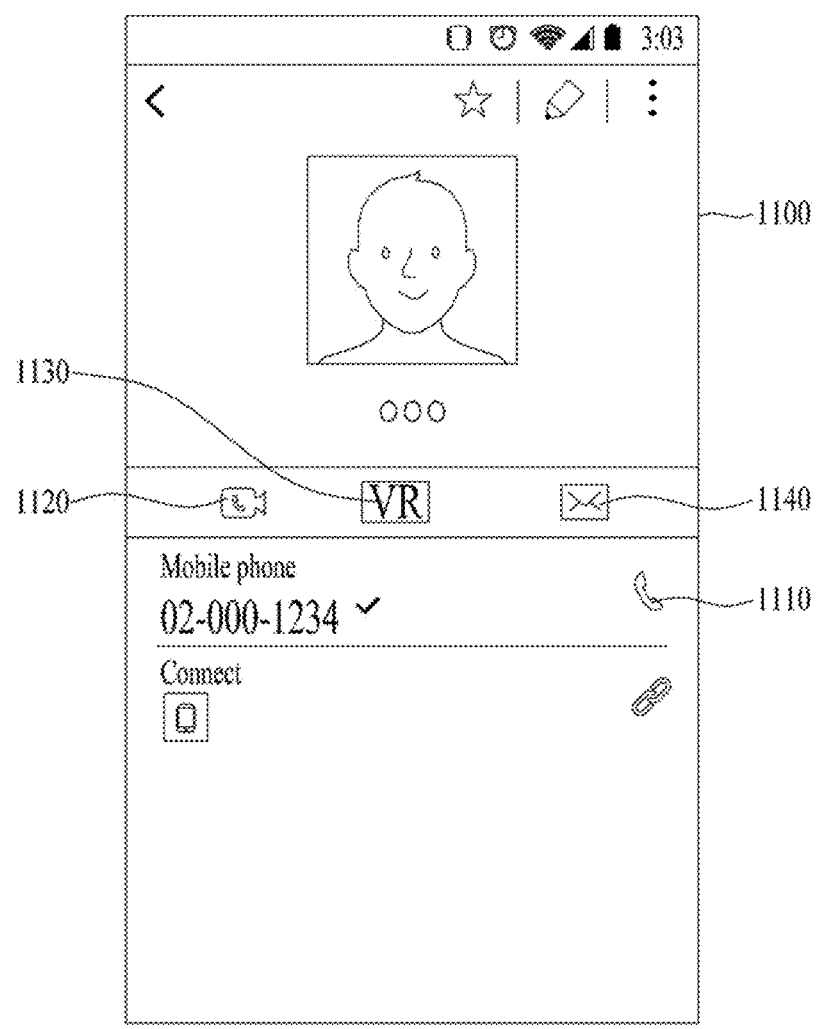
FIG. 11 is a diagram illustrating one example of a method for a first mobile terminal to request a video call for providing a VR image according to one embodiment of the present invention.

Next, FIG. 11 is a diagram illustrating one example of a method for a first mobile terminal to request a video call for providing a VR image according to one embodiment of the present invention. The controller 180 of the first mobile terminal 100A launches a contact application (or call application) and the displays a launch screen 1100 on the display unit 151. The launch screen 1100 may be a screen corresponding to a user of the second mobile terminal 100B.

The launch screen 1100 includes a first menu option 1110 for making a request for a voice call to the second mobile terminal 100B, a second menu option 1120 for making a request for a general video call to the second mobile terminal 100B, a third menu option 1130 for making a request for a video call to provide a VR image to the second mobile terminal 100B and a fourth menu option 1140 for transmitting a text message to the second mobile terminal 100B.

The controller 180 of the first mobile terminal 100A transmits a signal for requesting the video call for providing the VR image to the second mobile terminal 100B through the wireless communication unit 110 in accordance with a command for selecting the third menu option 1130, activates the camera 121, and may then generate the VR image using a plurality of images obtained by the activated camera 121.

Figure 12:
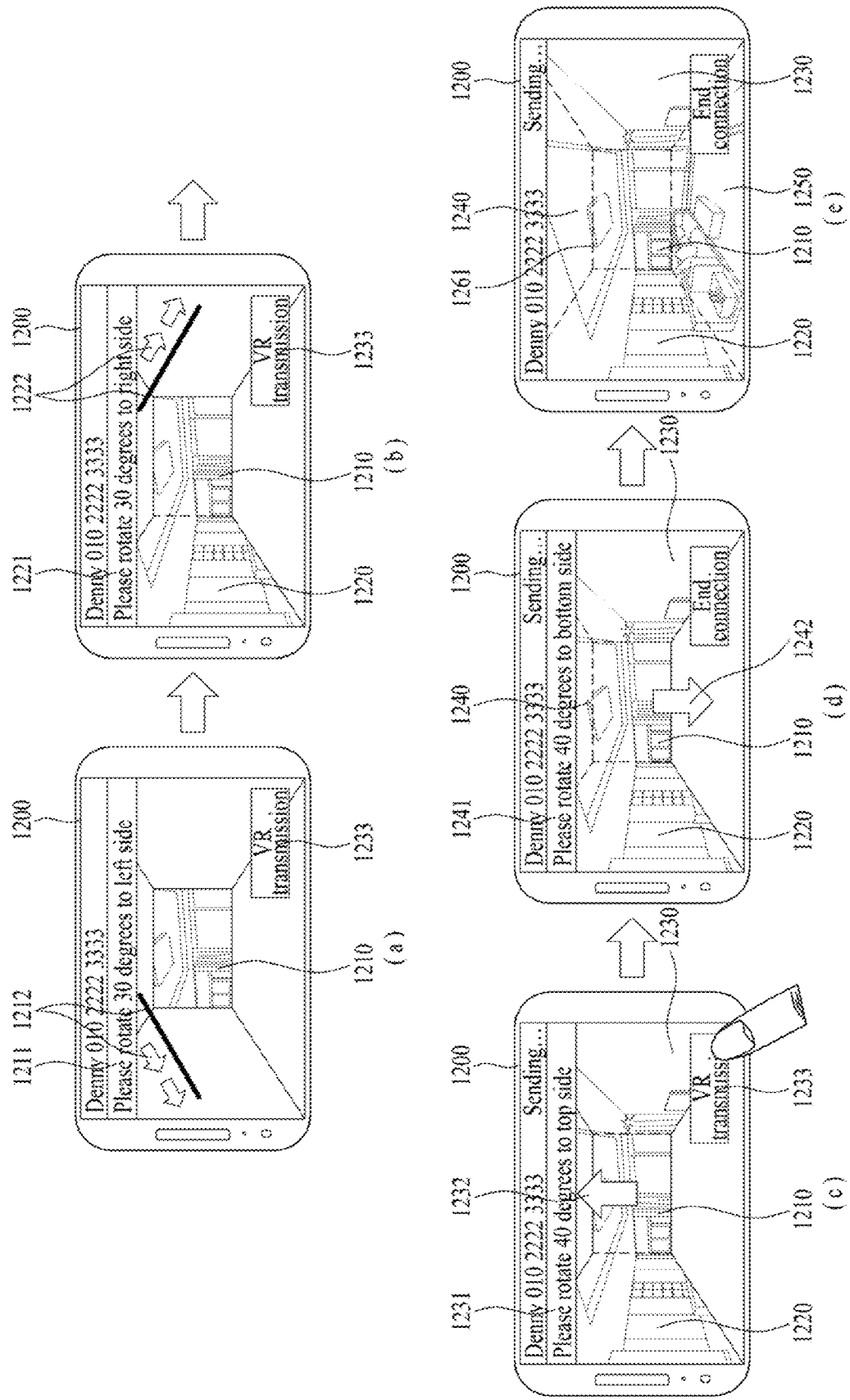
FIG. 12 is a diagram illustrating one example of a method for a first mobile terminal to generate a VR image according to one embodiment of the present invention.

FIG. 12 is a diagram illustrating one example of a method for a first mobile terminal to generate a VR image according to one embodiment of the present invention. The controller 180 of the first mobile terminal 100A can generate a VR image by matching a plurality of images obtained by the camera 121 with each other. The controller 180 of the first mobile terminal 100A can generate the VR image after having transmitted a signal for requesting a video call for providing the VR image to the second mobile terminal 100B. And, the controller 180 of the first mobile terminal 100A can transmit the signal for requesting the video call for providing the VR image to the second mobile terminal 100B in accordance with a preset command during generating the VR image.

Referring to FIG. 12(a), the controller 180 of the first mobile terminal 100A can output a first screen 1200 to the display unit 151 in accordance with a command for selecting the video call to provide the VR image to the second mobile terminal 100B. The first screen 1200 includes a first image 1210 obtained by an activated camera 121 in accordance with the command for selecting the video call. The first image 1210 may corresponds to a video image (dynamic image) obtained by real time by the camera 121.

Moreover, the first screen 1200 includes a guide UI for guiding a method of obtaining a plurality of images used to generate the VR image. For instance, the first screen 1200 includes a guide message 1211 and graphics 1212 for indicating a moving direction of the camera 121 in order to obtain images used to generate the VR image.

Referring to FIG. 12(b), a user of the first mobile terminal 100A changes a location (angle) of the camera 121 based on the guide message 1211 and graphics 1212. An image (1220) corresponding to at least a part of a second image obtained at the changed location (angle) by the camera 121 is displayed on the display unit 151. The controller 180 of the first mobile terminal 100A analyses both of the first image 1210 and the second image obtained by the camera 121, matches (synthesizes) the first image 1210 and the second image with each other through edge analysis, color analysis and the like between objects identical to each other included in both of the first image 1210 and the second image, and may then display the matched images 1210 and 1220 on the display unit 151.

In this instance, the image 1220 displayed on the display unit 151 may correspond to a static image (still image) instead of a video image. And, the controller 180 of the first mobile terminal 100A can display a guide message 1221 and graphics 1222 for indicating a moving direction of the camera 121 on the first screen 1200 in order to guide a method of further obtaining images used to generate the VR image.

Referring to FIG. 12(c), the user of the first mobile terminal 100A changes a location (angle) of the camera 121 based on the guide message 1221 and graphics 1222. An image (1230) corresponding to at least a part of a third image obtained at the changed location (angle) by the camera 121 is displayed on the display unit 151. The controller 180 of the first mobile terminal 100A analyses both of the first image 1210 and the third image obtained by the camera 121, matches (synthesizes) the first image 1210 and the third image with each other through edge analysis, color analysis and the like between objects identical to each other included in both of the first image 1210 and the third image, and may then display the matched images 1210 and 1230 on the display unit 151.

In this instance, the image 1230 displayed on the display unit 151 may correspond to a static image (still image) instead of a video image. And, the controller 180 of the first mobile terminal 100A can display a guide message 1231 and graphics 1232 for indicating a moving direction of the camera 121 on the first screen 1200 in order to guide a method of further obtaining images used to generate the VR image.

Meanwhile, the user of the first mobile terminal 100A can select a menu option 1233 included in the first screen 1200. The menu option 1233 may correspond to a function of requesting the video call to provide the VR image to the second mobile terminal 100B. The user of the first mobile terminal 100A can request the video call before the VR image is generated. Alternatively, the user of the first mobile terminal 100A can request the video call while the VR image is generated. Further, the user of the first mobile terminal 100A can request the video call after the generation of the VR image is primarily completed. The controller 180 of the first mobile terminal 100A can transmit a signal for requesting the video call to provide the VR image to the second mobile terminal through the wireless communication unit 110 during generating the VR image in accordance with a command for selecting the menu option 1233.

Referring to FIG. 12(d), the user of the first mobile terminal 100A changes a location (angle) of the camera 121 based on the guide message 1231 and graphics 1232. An image (1240) corresponding to at least a part of a fourth image obtained at the changed location (angle) by the camera 121 is displayed on the display unit 151. At the same time, the first mobile terminal 100A can keep requesting the video call to the second mobile terminal 100B. The controller 180 of the first mobile terminal 100A analyses the first image 1210 to the fourth image obtained by the camera 121, matches (synthesizes) the first image 1210 to the fourth image with each other through edge analysis, color analysis and the like between objects identical to each other included in the first image 1210 to the fourth image, and may then display the matched images 1210, 1220, 1230 and 1240 on the display unit 151.

In this instance, the image 1240 displayed on the display unit 151 may correspond to a static image (still image) instead of a video image. And, the controller 180 of the first mobile terminal 100A can display a guide message 1241 and graphics 1242 for indicating a moving direction of the camera 121 on the first screen 1200 in order to guide a method of further obtaining images used to generate the VR image.

Referring to FIG. 12(*e*), the user of the first mobile terminal 100A changes a location (angle) of the camera 121 based on the guide message 1241 and graphics 1242. An image (1250) corresponding to at least a part of a fifth image obtained at the changed location (angle) by the camera 121 is displayed on the display unit 151. At the same time, the first mobile terminal 100A can keep requesting the video call to the second mobile terminal 100B. The controller 180 of the first mobile terminal 100A analyses the first image 1210 to the third image and the fifth image obtained by the camera 121, matches (synthesizes) the first image 1210 to the third image and the fifth image with each other through edge analysis, color analysis and the like between objects identical to each other included in the first image 1210 to the third image and the fifth image, and may then display the matched images 1210, 1220, 1230 and 1250 on the display unit 151. In this instance, the image 1250 displayed on the display unit 151 may correspond to a static image (still image) instead of a video image.

Thus, the controller 180 of the first mobile terminal 100A matches the first image 1210 to the fifth image obtained by the camera 121 and may then generates the VR image having the angle of view equal to or greater than a preset degree. Moreover, the controller 180 of the first mobile terminal 100A can extract a depth information from the first image 1210 to the fifth image by utilizing such an object information on image as information on overlapping boundaries of object, information on size of object and the like.

Depending on an embodiment, the controller of the first mobile terminal 100A can display an indicator 1261 indicating a region in which the user of the first mobile terminal 100A is currently photographing an image using the camera 121 in real time on the corresponding VR image among the generated VR images. In the present embodiment, the number of images used for generating the VR image may differ depending on an embodiment, by which the present embodiment is non-limited.

Figure 13:
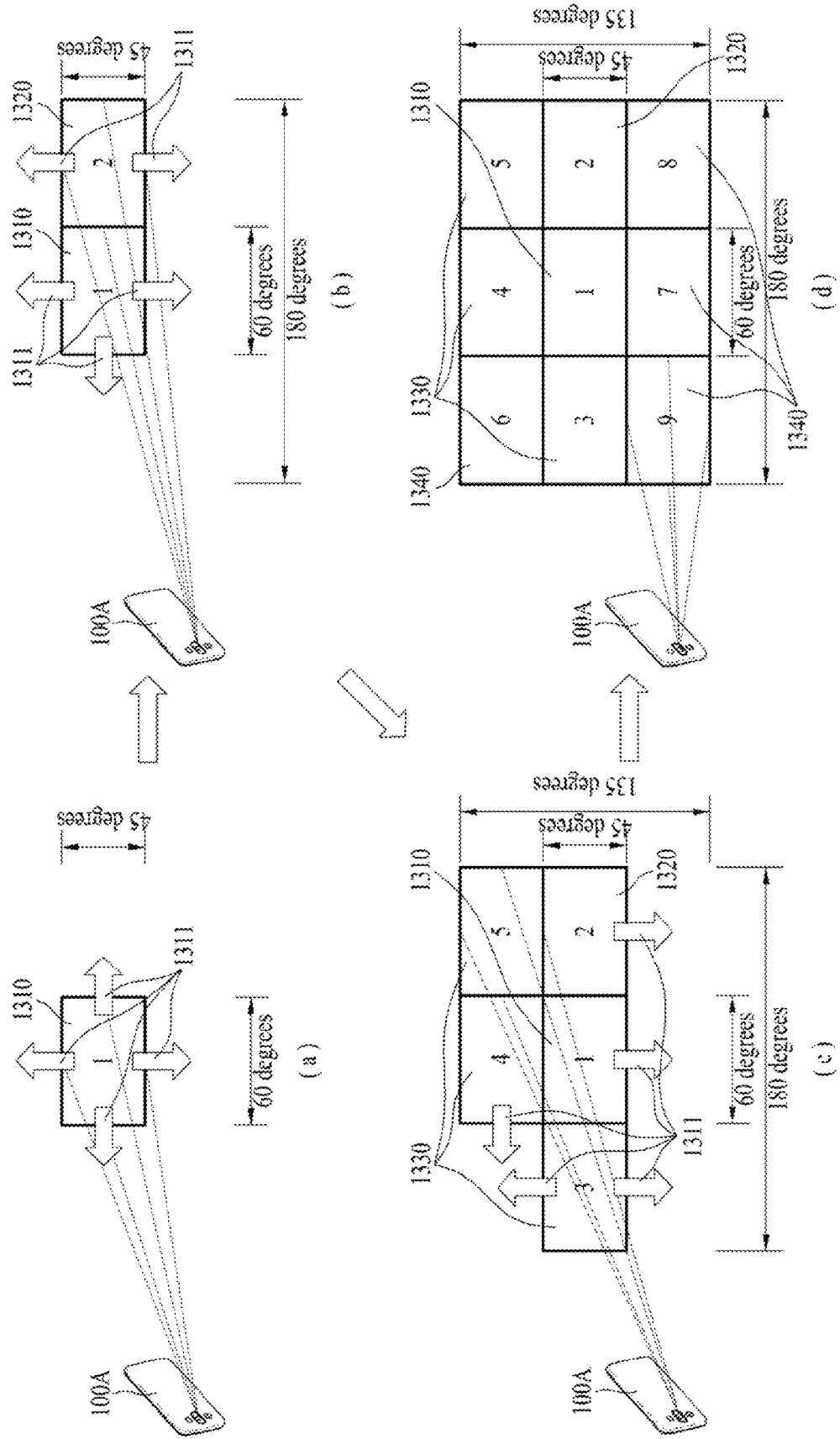
FIG. 13 is a schematic diagram illustrating one example of a method for a first mobile terminal to generate a VR image according to one embodiment of the present invention.

FIG. 13 is a schematic diagram illustrating one example of a method for a first mobile terminal to generate a VR image according to one embodiment of the present invention. In particular, FIG. 13 describes an example of a method of generating a VR image having an angle of view of 180 degrees from left to right and the angle of view of 180 degrees from top to bottom using the camera 121 of the first mobile terminal having the angle of view of 60 degrees from left to right and the angle of view of 45 degrees from top to bottom.

Referring to FIG. 13(*a*), the controller 180 of the first mobile terminal 100A obtains a first image 1310 using the camera 121. Since a plurality of image besides the first image 1310 are required to generate a VR image having an angle of view equal to or greater than a preset degree, a user of the first mobile terminal 100A changes a location (angle) of the camera 121 toward the outside of the first image 1310, thereby being able to further obtain a plurality of the images.

In this instance, the controller 180 of the first mobile terminal 100A can display an indicator 1311 indicating a moving direction of the camera 121 used for further obtaining images used to generate the VR image on the display unit 151.

Referring to FIG. 13(*b*), the user of the first mobile terminal 100A can photograph a second image 1320 by moving the camera 121 to the right by a preset distance or changing an angle of the camera 121 to the right by a preset degree. The controller 180 of the first mobile terminal 100A can generate an image having the angle of view of 120 degrees from left to right and the angle of view of 45 degrees from top to bottom by matching the first image 1310 and the second image 1320. And, the controller 180 of the first mobile terminal 100A can display the indicator 1311 indicating the moving direction of the camera 121 used for further obtaining the images used to generate the VR image on the display unit 151. In this instance, for instance, since it is not used to obtain any more images from the right side of the second image 1320 in generating the VR image, an indicator indicating the right side of the second image 1320 may not be displayed on the display unit 151.

Referring to FIG. 13(*c*), the user of the first mobile terminal 100A can additionally photograph third to fifth images 1330 by moving the camera 121 based on the direction indicated by the indicator 1311. The controller 180 of the first mobile terminal 100A can generate an image having the angle of view of 180 degrees from left to right and the angle of view of 90 degrees from top to bottom by matching the first to fifth images 1310, 1320 and 1330. And, the controller 180 of the first mobile terminal 100A can display the indicator 1311 indicating the moving direction of the camera 121 used for further obtaining the images used to generate the VR image on the display unit 151.

Referring to FIG. 13(*d*), the user of the first mobile terminal 100A can additionally photograph sixth to ninth images 1340 by moving the camera 121 based on the direction indicated by the indicator 1311. The controller 180 of the first mobile terminal 100A can generate the VR image having the angle of view of 180 degrees from left to right and the angle of view of 180 degrees from top to bottom by matching the first to $9^{th}$ images 1310, 1320, 1330 and 1340.

Figure 14:
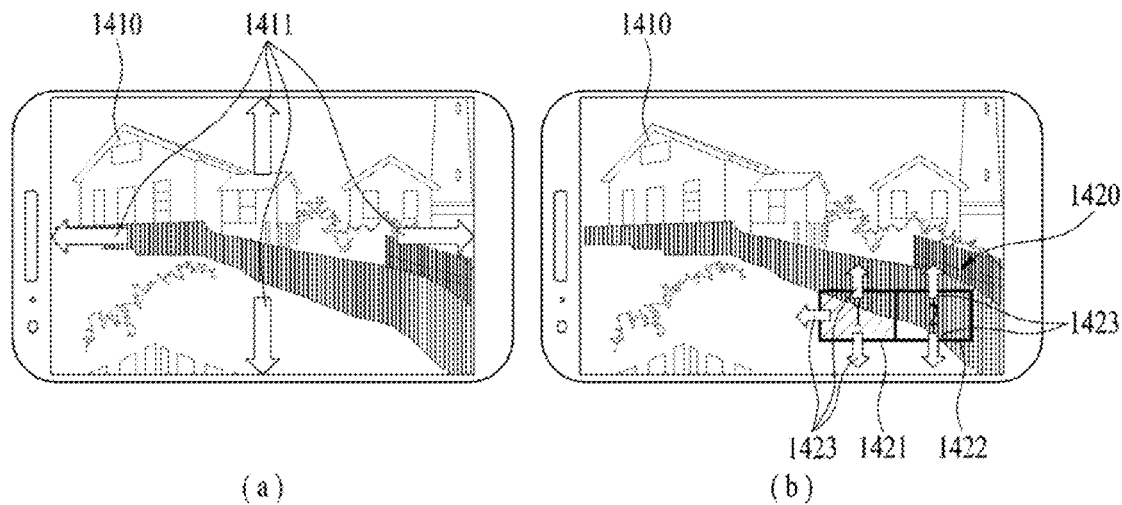
FIG. 14 is a diagram illustrating one example of a guide UI output to obtain an image used for a first mobile terminal to generate a VR image according to one embodiment of the present invention.

FIG. 14 is a diagram illustrating one example of a guide UI output to obtain an image used for a first mobile terminal to generate a VR image according to one embodiment of the present invention. The controller 180 of the first mobile terminal 100A outputs a first image 1410 obtained by the camera 121 to the display unit 151. The first image 1410 may correspond to a video image (dynamic image) obtained by real time by the camera 121.

The controller 180 of the first mobile terminal 100A can display a guide UI for guiding a method of obtaining a plurality of images used to generate a VR image on the display unit 151. For instance, referring to FIG. 14(*a*), the controller 180 of the first mobile terminal 100A can display an indicator 1411 indicating a moving direction of the camera 121 on the display unit 151 in order to obtain images used to generate the VR image having an angle of view equal to or greater than a preset degree. If a prescribed image is obtained from the images used to generate the VR image in a manner that a user of the first mobile terminal 100A obtains image by moving the camera 121, the controller 180 of the first mobile terminal 100A can remove the indicator 1411 corresponding to the obtained prescribed image on the display unit 151.

In another example, referring to FIG. 14(*b*), the controller 180 of the first mobile terminal can display a guide UI 1420 of a mini-map type on the display unit 151 in order to obtain images used to generate the VR image having the angle of view equal to or greater than a preset degree. The guide UI 1420 includes indicators 1421 and 1422, which correspond to images obtained up to now among a plurality of the images used to generate the VR image, respectively. And, the guide UI 1420 includes an indicator 1423 indicating a moving direction of the camera 121 to obtain images used to generate the VR image.

The controller 180 of the first mobile terminal 100A can display the indicator 1421, which corresponds to an image currently displayed on the display unit 151, of the indicators 1421 and 1422 by distinguishing the indicator 1421 from the other indicator 1422. If a prescribed image is obtained from the images used to generate the VR image in a manner that the user of the first mobile terminal 100A obtains image by moving the camera 121, the controller 180 of the first mobile terminal 100A can remove the indicator 1423 corresponding to the obtained prescribed image on the display unit 151.

Figure 15:
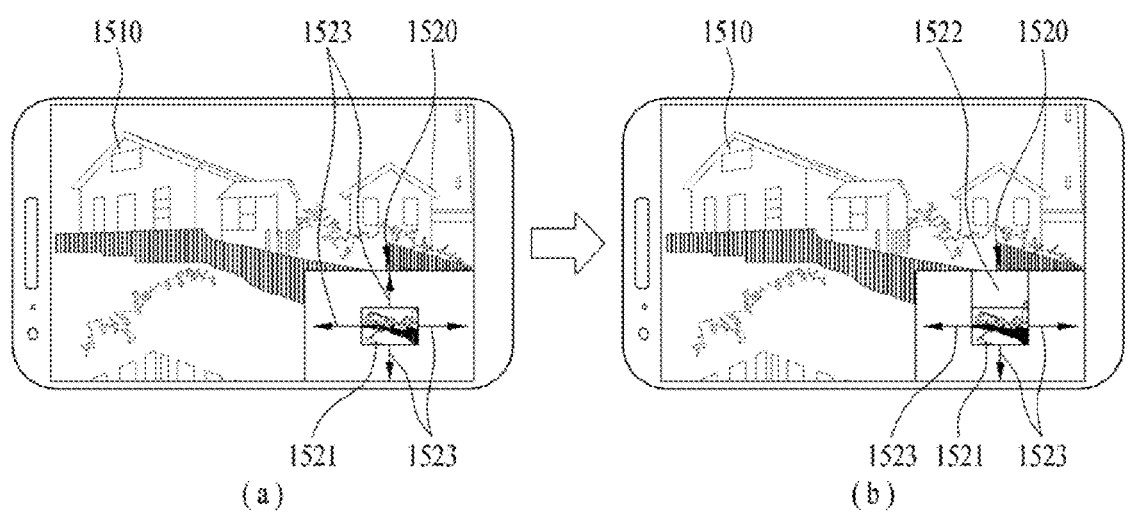
FIG. 15 is a diagram illustrating another example of a guide UI output to obtain an image used for a first mobile terminal to generate a VR image according to one embodiment of the present invention.

FIG. 15 is a diagram illustrating another example of a guide UI output to obtain an image used for a first mobile terminal to generate a VR image according to one embodiment of the present invention. The controller 180 of the first mobile terminal 100A outputs a first image 1510 obtained by the camera 121 to the display unit 151. The first image 1510 may correspond to a video image (dynamic image) obtained by real time by the camera 121.

The controller 180 of the first mobile terminal 100A can display a guide UI 1520 of a mini-map type on the display unit 151 in order to obtain images used to generate a VR image having an angle of view equal to or greater than a preset degree. The guide UI 1420 includes indicators 1521 and 1522, which correspond to images obtained up to now among a plurality of the images used to generate the VR image, respectively. For instance, each of the indicators 1521 and 1522 may correspond to an image resulting from reducing each of images obtained by the camera 121 by a preset rate.

The controller 180 of the first mobile terminal 100A can display the indicator 1521, which corresponds to an image currently displayed on the display unit 151, of the indicators 1521 and 1522 by distinguishing the indicator 1521 from the other indicator 1522. Moreover, the guide UI 1520 includes an indicator 1523 indicating a moving direction of the camera 121 to obtain images used to generate the VR image. If a prescribed image is obtained from the images used to generate the VR image in a manner that the user of the first mobile terminal 100A obtains image by moving the camera 121, the controller 180 of the first mobile terminal 100A can remove the indicator 1523 corresponding to the obtained prescribed image on the display unit 151.

Figure 16:
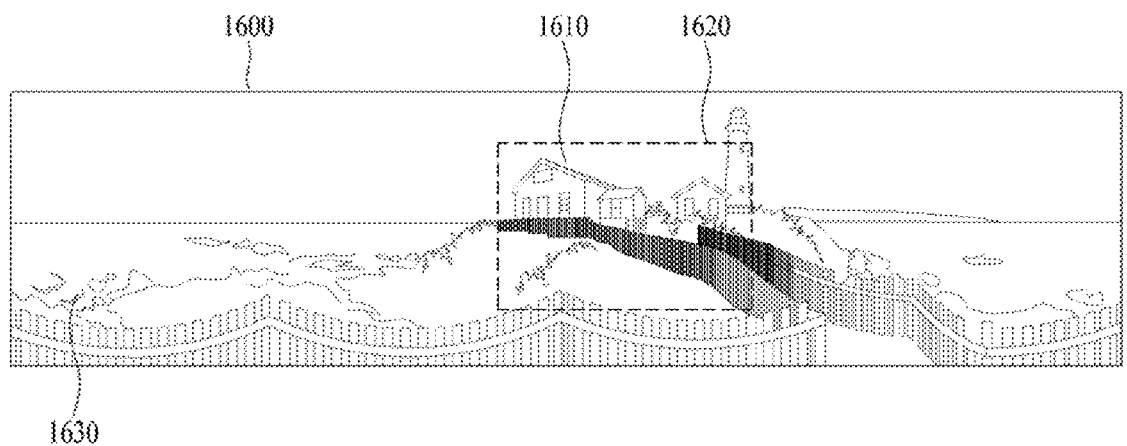
FIG. 16 is a diagram illustrating one example of a VR image generated by a first mobile terminal according to one embodiment of the present invention.

FIG. 16 is a diagram illustrating one example of a VR image generated by a first mobile terminal according to one embodiment of the present invention. Referring to FIG. 16, the controller 180 of the first mobile terminal 100A can generate a VR image 1600 using a plurality of images obtained by the camera 121. As mentioned in the foregoing description with reference to FIGS. 12 to 15, the VR image 1600 can be generated as follows. First of all, a user of the first mobile terminal 100A photographs a plurality of images by changing a location (angle) of the camera 121. Secondly, the controller 180 of the first mobile terminal 100A matches a plurality of the photographed images.

The VR image 1600 includes a dynamic image 1620 obtained by real time by the camera 121. And, a region in the VR 1600 image except a region corresponding to the dynamic image 1620 may correspond to a static image. Depending on an embodiment, the controller 180 of the first mobile terminal 100A can display an indicator 1620 for indicating the region of the dynamic image 1620 in the VR image 1600 on the VR image 1600.

Depending on an embodiment, if a location of the camera 121 is changed by the user of the first mobile terminal 100A after the VR image 1600 is primarily generated, at least a part of the VR image 1600 may be updated as a new image. And, the region of the dynamic image 1620 may be updated as a new dynamic image obtained by the camera 121 having the location changed thereof. Moreover, the region which has corresponded to the dynamic image 1620 may be filled with the static image. Furthermore, at least a part of the static image may be re-photographed since the location of the camera 121 is changed by the user of the first mobile terminal 100A. In this instance, if the re-photographed image has higher reliability than the existing static image, the controller 180 of the first mobile terminal 100A can update the existing static image using the re-photographed static image. In this instance, the reliability of the image may be determined by the definition of the image.

Moreover, depending on an embodiment, the controller 180 of the first mobile terminal 100A can give a motion effect to a preset part of the static image within the VR image 1600. In this instance, the motion effect means a visual effect given to a static image in order to enable a user to feel a repetitive motion in a preset part of the static image, which actually corresponds to an image without motion.

In particular, the controller 180 of the first mobile terminal 100A detects a part 1630 (e.g., part corresponding to motion of wave) indicating a repetitive motion of images obtained by the camera 121 to generates the VR image 1600, obtain a period of the repetitive motion present in the detected part 1630, may then give the visual effect for enabling the motion of the detected part 1630 to be repeated in accordance with the obtained period in case of implementing an image including the detected part 1630 as the static image within the VR image 1600. For instance, the controller 180 of the first mobile terminal 100A extracts the part 1630 indicating the repetitive motion from the images obtained by the camera 121 and may then play only a region of an object corresponding to the part 1630 extracted from the images obtained by the camera 121 within the VR image 1600 repeatedly. Therefore, if a user of a second mobile terminal 100B watches the VR image 1600 in a situation of wearing the VR device 500, the user of the second mobile terminal 100B can sense the motion of wave in the part 1630 despite that the part 1630 of the VR image 1600 does not correspond to the dynamic image obtained by real time.

Figure 17:
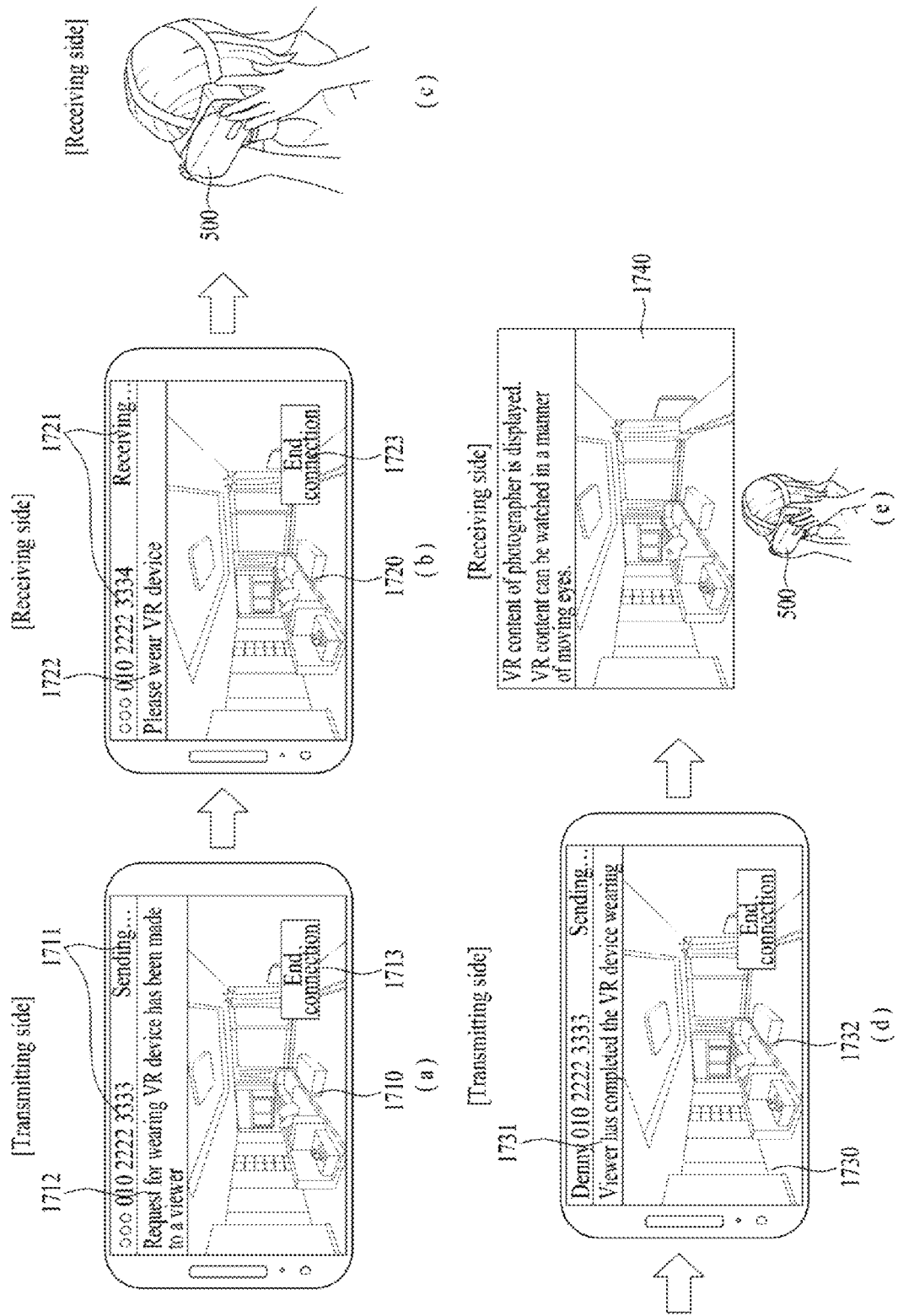
FIG. 17 is a diagram illustrating one example of a process for performing a video call between a first mobile terminal and a second mobile terminal to provide a VR image according to one embodiment of the present invention.

Next, FIG. 17 is a diagram illustrating one example of a process for performing a video call between a first mobile terminal and a second mobile terminal to provide a VR image according to one embodiment of the present invention. Referring to FIG. 17(a), the controller 180 of the first mobile terminal 100A transmits a first signal for requesting a video call for providing a VR image to the second mobile terminal 100B through the wireless communication unit 110 in accordance with a user command.

According to the user command, the controller 180 of the first mobile terminal 100A activates the camera 121 and then displays an image 1710 obtained using the activated camera 121 on the display unit 151. The image 1710 may corresponds to at least a part of a generated VR image. Moreover, the controller 180 of the first mobile terminal 100A can display an information 1711 indicating that a request for the vide call to the second mobile terminal 100B is being made on the display unit 151. And, the controller 180 of the first mobile terminal 100A can display an information 1712 indicating that a request for wearing the VR device 500 to a user of the second mobile terminal 100B has been made on the display unit 151.

Moreover, the controller 180 of the first mobile terminal 100A can display a menu option 1713 for canceling the request for the video call to the second mobile terminal 100B on the display unit 151. Referring to FIG. 17(b), the controller 180 of the second mobile terminal 100B outputs a screen 1720 corresponding to the video call for providing the VR image to the display unit 151 in accordance with the first signal transmitted from the first mobile terminal 100A on the display unit 151. The screen 1720 includes an information 1721 indicating that the request for the video call to provide the VR image has been made from the first mobile terminal 100A. And, the screen 1720 includes an information 1722 guiding the VR device 500 wearing. Depending on an embodiment, the screen 1720 includes at least a part of an image obtained by the camera 121 of the first mobile terminal 100A. Moreover, the screen 1720 may further include a menu option 1723 for canceling the request for the video call from the first mobile terminal 100A.

Referring to FIG. 17(c), the user of the second mobile terminal 100B connects the second mobile terminal 100B to the VR device 500 and then wears the VR device 500 on head. The controller 180 of the second mobile terminal 100B can detect whether the second mobile terminal 100B is connected to the VR device 500. If the connection between the second mobile terminal 100B and the VR device 500 is detected, the controller 180 of the second mobile terminal 100B can transmit a second signal for granting the request for the video call to provide the VR image to the first mobile terminal 100A through the wireless communication unit 110.

Meanwhile, in the processes of FIGS. 17(a) to (c), the first mobile terminal 100A can generate the VR image. Since the process for generating the VR image is the same as the process mentioned in the foregoing description with reference to FIGS. 12 to 16, the detailed description is omitted.

Referring to FIG. 17(d), the controller 180 of the first mobile terminal 100A can display a screen 1730 on the display unit 151 in accordance with the second signal. For instance, the screen 1730 includes an information 1731 indicating that the user of the second mobile terminal 100B has completed the VR device 500 wearing. And, the screen 1730 includes an image 1732 corresponding to at least a part of the generated VR image. For example, the image 1732 includes a dynamic image, which is obtained by real time by the camera 121, in the VR image.

And, the controller 180 of the first mobile terminal 100A converts the generated VR image into a left eye VR image and a right eye VR image and can then transmit the converted VR images to the second mobile terminal 100B through the wireless communication unit 110. During the video call for providing the VR image, the controller 180 of the first mobile terminal 100A generates/updates the VR image periodically, aperiodically or in real time and may then transmit the generated/updated VR image to the second mobile terminal 100B.

Referring to FIG. 17(e), the controller 180 of the second mobile terminal 100B outputs the VR image transmitted from the first mobile terminal 100A to the display unit 151. The user of the second mobile terminal 100B can see a VR image 1740 through the lenses 521 of the VR device 500. The VR image 1740 has an angle of view equal to or greater than a preset degree and a prescribed depth recognized by the user of the second mobile terminal 100B.

Figure 18:
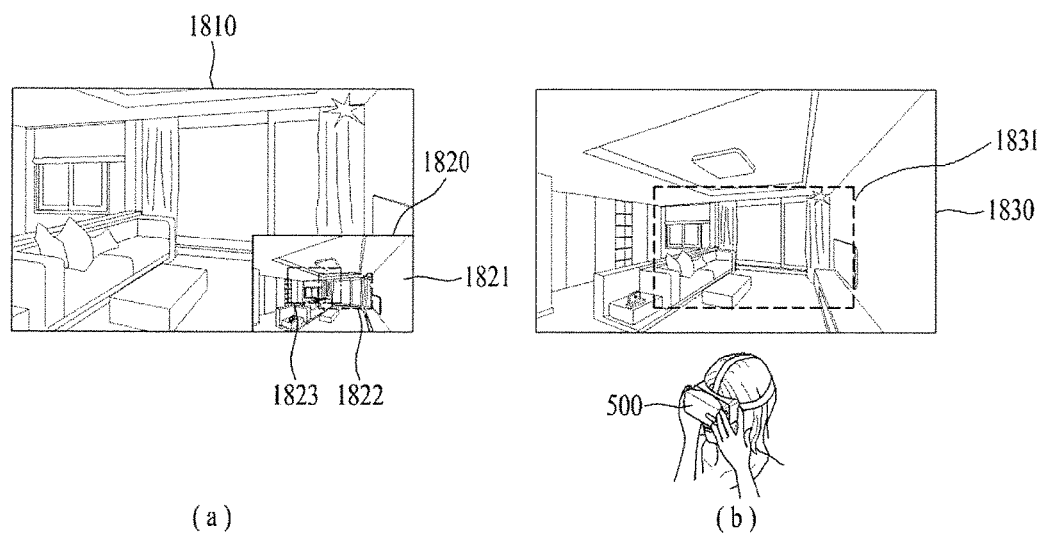
FIG. 18 is a diagram illustrating examples of a screen displayed on a first mobile terminal and a screen displayed on a second mobile terminal during a video call according to one embodiment of the present invention.

FIG. 18 is a diagram illustrating examples of a screen displayed on a first mobile terminal and a screen displayed on a second mobile terminal during a video call according to one embodiment of the present invention. Referring to FIG. 18(a), the controller 180 of the first mobile terminal 100A can output an image 1810 corresponding to at least a part of a generated VR image to the display unit 151 during a video call with the second mobile terminal 100B. For instance, the image 1810 may correspond to a dynamic image, which is obtained by real time by the camera 121, in the VR image.

And, the controller 180 of the first mobile terminal 100A can display an additional information 1820 corresponding to the VR image on the display unit 151. For example, the additional information 1820 includes an image 1821 resulting from reducing the VR image by a preset rate, a first indicator 1822 for indicating a location of the dynamic image in the VR image and a second indicator 1823 for indicating a region, which is watched by a user of the second mobile terminal 100B, in the VR image. The controller 180 of the first mobile terminal can receive an information on which region in the VR image is watched by the user of the second mobile terminal 100B from the second mobile terminal 100B through the wireless communication unit 110 periodically or aperiodically. For instance, if a location (or direction) of the region, which is watched by the user of the second mobile terminal, in the VR image is changed more than a preset degree, the controller 180 of the first mobile terminal 100A can receive the related information from the second mobile terminal 100B. The second mobile terminal 100B can detect head motion of the user of the second mobile terminal by detecting motion of the VR device 500 connected to the second mobile terminal 100B based on data sensed through the sensing unit 140. And, the second mobile terminal 100B can detect the head motion of the user of the second mobile terminal 100B and/or motion of eyes of the user of the second mobile terminal 100B based on data transmitted from the VR device 500.

According to an embodiment of the present invention, the user of the first mobile terminal 100A can easily recognize which part of the VR image is currently photographed through the camera 121 by the corresponding user and which part of the VR image is currently watched by the user of the second mobile terminal 100B interestedly.

Further, referring to FIG. (b), the controller 180 of the second mobile terminal 100B displays the VR image transmitted from the first mobile terminal 100A on the display unit 151. The user of the second mobile terminal 100B can watch a VR image 1830 distorted by the lenses 521 of the VR device 500. Depending on an embodiment, the controller 180 of the second mobile terminal 100B can display an indicator 1831 for indicating a location of the dynamic image, which is obtained by real time by the camera 121 of the first mobile terminal 100A, in the VR image 1830 on the VR image 1830. Thus, the user of the second mobile terminal 100B can easily recognize which part of the VR image 1830 corresponds to a real-time image and which part of the VR image 1830 corresponds to a pre-obtained static image.

Figure 19:
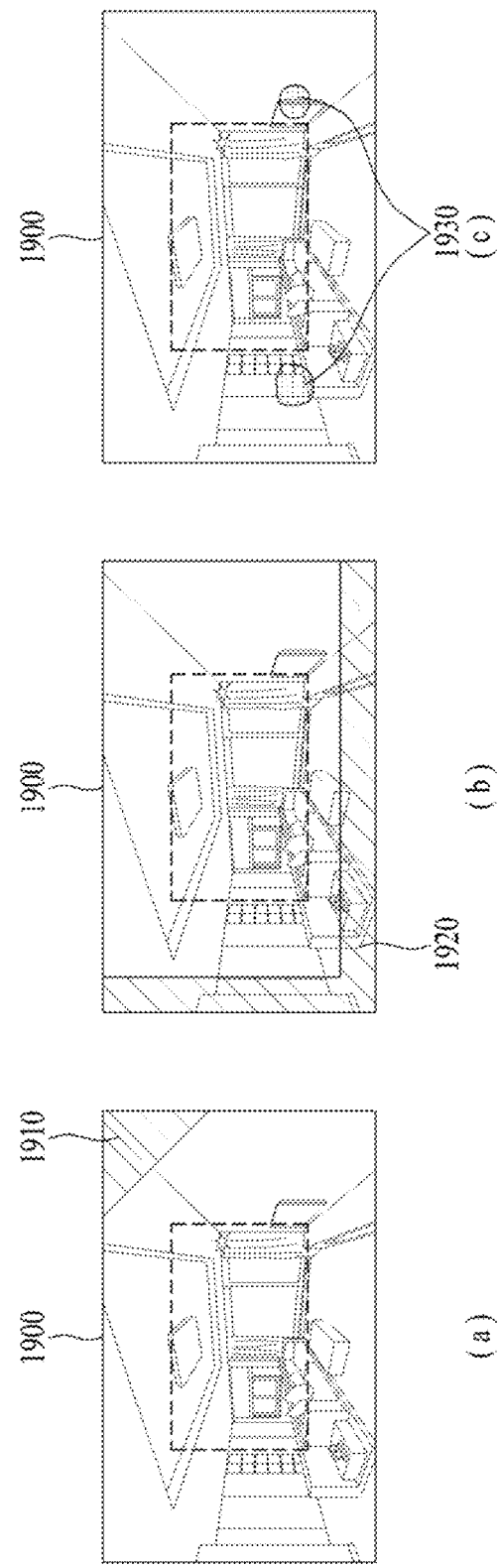
FIG. 19 is a diagram illustrating another example of a method for a first mobile terminal to generate a VR image according to one embodiment of the present invention.

FIG. 19 is a diagram illustrating another example of a method for a first mobile terminal to generate a VR image according to one embodiment of the present invention. The controller 180 of the first mobile terminal 100A can generate a VR image 1900 by matching at least a part of a plurality of images obtained by the camera 121. In this instance, if a part of the VR image 1900 cannot be generated using only the images obtained by the camera 121, the controller 180 of the first mobile terminal 100A can complement it using a preset scheme.

For instance, referring to FIG. 19(a), a part 1910 of the VR image 1900 cannot be generated using only the images obtained the camera 121 since there may be a part not photographed by a user of the first mobile terminal 100A accidently or reliability of a photographed image may be lower than a preset value. In this instance, the part 1910 may be filled by blurring a region adjacent to the part 1910 of the VR image 1900 up to the part 1910 or gradation processing.

In another example, referring to FIG. 19(b), a part 1920 of the VR image 1900 cannot be generated using only the images obtained the camera 121 since there may be a part not photographed by the user of the first mobile terminal 100A accidently or reliability of the photographed image may be lower than a preset value. In this instance, the part 1920 may be filled by enlarging a region adjacent to the part 1920 of the VR image 1900 up to the part 1920.

In another example, referring to FIG. 19(c), a part 1930 of the VR image 1900 cannot be generated using only the images obtained by the camera 121 as following reasons. First of all, there may be a part not photographed by the user of the first mobile terminal 100A accidently. Secondly, there may be a part not photographed due to the part covered with an object when the user of the first mobile terminal 100A photographs images by moving the camera 121. In this instance, the part 1930 may be filled by blurring a region adjacent to the part 1930 of the VR image 1900 to the part 1930 or gradation processing.

Meanwhile, according to one embodiment of the present invention, it may switch into a video call for providing a VR image during a general video call between the first mobile terminal 100A and the second mobile terminal 100B. It will be described with reference to FIGS. 20 and 21.

Figure 20:
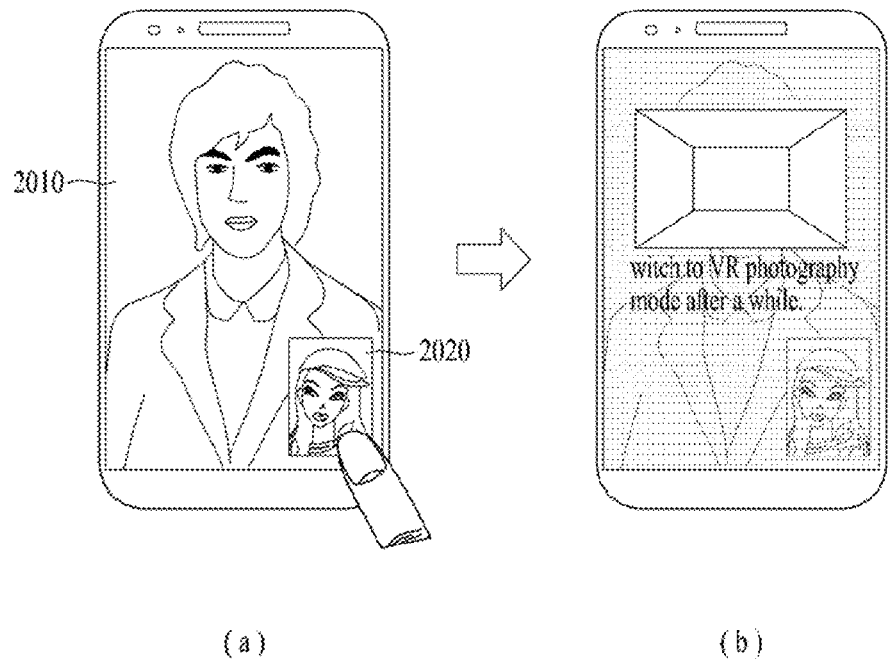
FIG. 20 is a diagram illustrating one example of a method for switching into a video call for providing a VR image during a general video call between a first mobile terminal and a second mobile terminal according to one embodiment of the present invention.

FIG. 20 is a diagram illustrating one example of a method for switching into a video call for providing a VR image during a general video call between a first mobile terminal and a second mobile terminal according to one embodiment of the present invention. The mobile terminal 100 in FIG. 20 can correspond to a transmitting side mobile terminal or a receiving side mobile terminal.

Referring to FIG. 20(a), the controller 180 of the mobile terminal 100 outputs a screen corresponding to a video call to the display unit 151 during a general video call. The screen includes an image 2010 transmitted from the mobile terminal 100 corresponding to the other user in the video call and an image 2020 obtained by front camera 121 of corresponding user.

The controller 180 of the mobile terminal 100 detects a preset command for switching the general video call into the video call for providing the VR image. For instance, the preset command may correspond to a command for tapping the image 2020 twice. Alternatively, the preset command may correspond to a granting command for a pop-up message for requesting a configuration of switching into VR video call output to the display unit 151 in the course of switching from the front camera 121 into a rear camera 121.

Referring to FIG. 20(b), the controller 180 of the mobile terminal 100 transmits a signal for switching the general video call into the video call for providing the VR image to the mobile terminal 100 corresponding to the other user in accordance with the preset command and may then display a guide message that indicates switching into the video call for providing the VR image. For instance, the mobile terminal 100 detecting the preset command may become the transmitting side mobile terminal 100A in the video call for providing the VR image.

Figure 21:
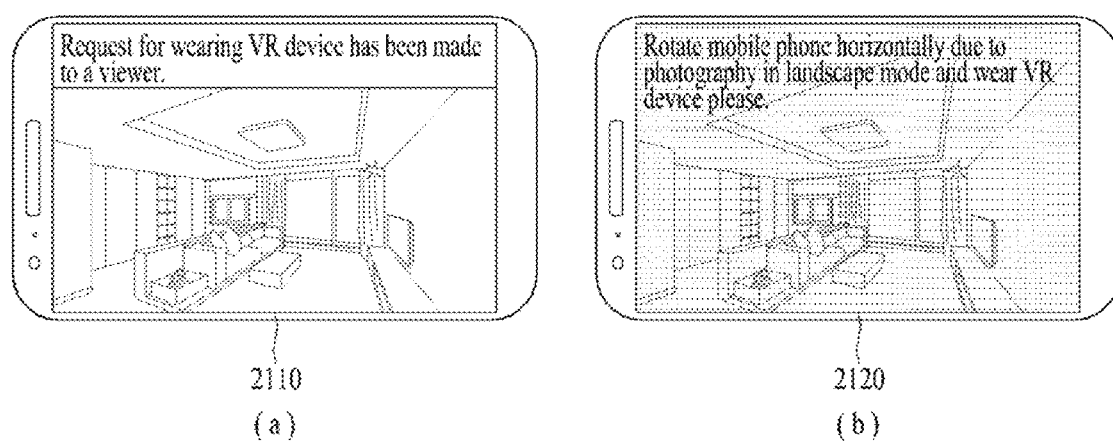
FIG. 21 is a diagram illustrating one example of a screen displayed on each of a first mobile terminal and a second mobile terminal in case of switching into a video call for providing a VR image during a general video call between the first mobile terminal and the second mobile terminal according to one embodiment of the present invention.

FIG. 21 is a diagram illustrating one example of a screen displayed on each of a first mobile terminal and a second mobile terminal in case of switching into a video call for providing a VR image during a general video call between the first mobile terminal and the second mobile terminal according to one embodiment of the present invention. Referring to FIG. 21(a), the controller 180 of the first mobile terminal 100A displays a first screen 2110 on the display unit 151 in accordance with a preset command for switching a general video call into a video call for providing a VR image.

The first screen 2110 includes an image obtained by the camera 121 but may not include an image transmitted from the second mobile terminal 100B of the other user unlike the general video call. And, the controller 180 of the first mobile terminal 100A transmits a signal for requesting for switching into the video call to provide the VR image to the second mobile terminal 100B and may then generate the VR image. Since the process for generating the VR image is the same as the process mentioned in the foregoing description with reference to FIGS. 12 to 16, the detailed description is omitted.

Moreover, the controller 180 of the first mobile terminal 100A can display an information indicating that a request for wearing the VR device 500 to the second mobile terminal has been made on the first screen 2110 in accordance with the preset command.

Meanwhile, referring to FIG. 21(b), the controller 180 of the second mobile terminal 100B displays a second screen 2120 on the display unit 151 in accordance with the signal transmitted from the first mobile terminal. The second screen 2120 includes a message that guides the VR device 500 wearing in accordance with switching into the video call for providing the VR image. And, the controller 180 of the second mobile terminal 100B can transmit a signal for granting the video call for providing the VR image to the first mobile terminal 100A in accordance with completion of connection between the second mobile terminal 100B and the VR device 500.

Since the later process is similar to the process mentioned in the foregoing description with reference to FIG. 17, the detailed description is omitted. According to one embodiment of the present invention, an appropriate feedback can be provided in accordance with an action of a user of the second mobile terminal 100B. It will be described with reference to FIG. 22.

Figure 22:
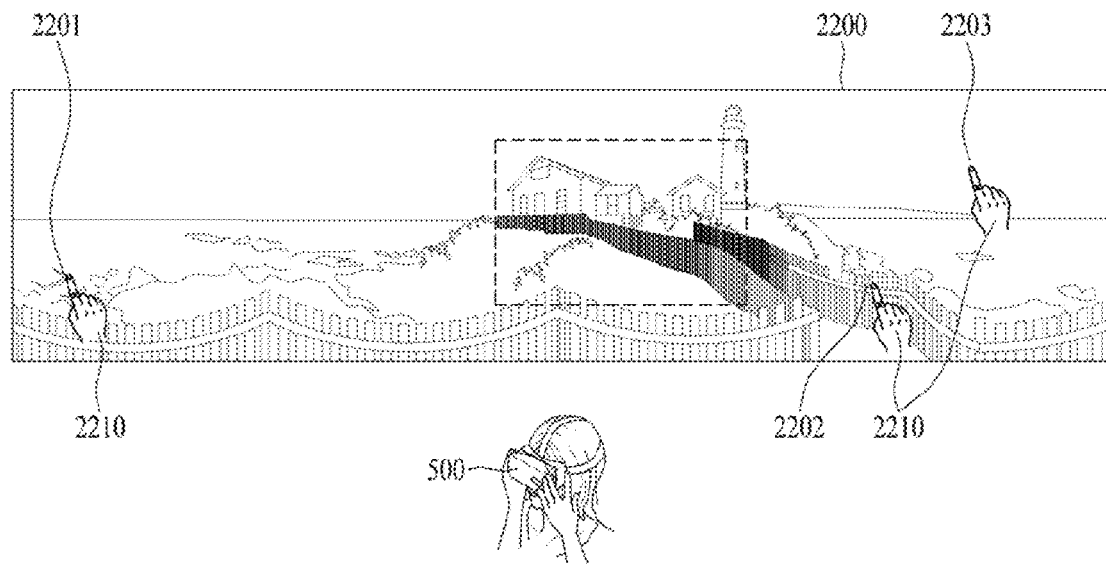
FIG. 22 is a diagram illustrating one example of a method for a second mobile terminal 100B to provide a feedback in accordance with an action of a user according to one embodiment of the present invention.

FIG. 22 is a diagram illustrating one example of a method for a second mobile terminal 100B to provide a feedback in accordance with an action of a user according to one embodiment of the present invention. The controller 180 of the second mobile terminal 100B displays a VR image 2200 transmitted from the first mobile terminal 100A on the display unit 151. A user of the second mobile terminal can watch the VR image 2200 in a situation of wearing the VR device 500 to which the second mobile terminal 100B is connected.

In the present embodiment, the controller 180 of the first mobile terminal 100A recognizes an object included in the VR image 220 and can then determine characteristics of the object based on an information saved in the memory 170. For instance, the controller 180 of the first mobile terminal 100A recognizes a first object 2201 included in the VR image 2200. If the first object 2201 corresponds to a wave, the controller 180 of the first mobile terminal 100A can understand general characteristics (e.g., motion characteristics, sound characteristics, texture characteristics, etc.) of the wave based on an analysis result of the first object 2201 included in at least one image used for generating the VR image 2200 and the information saved in the memory 170.

Likewise, the controller 180 of the first mobile terminal 100A recognizes a second object 2202 included in the VR image 2200. If the second object corresponds to a wooden fence, the controller 180 of the first mobile terminal 100A can understand general characteristics (e.g., motion characteristics, strength characteristics, texture characteristics, etc.) of the wooden fence. Moreover, the controller 180 of the first mobile terminal 100A recognizes a third object 2203 included in the VR image 2200. If the third object corresponds to a sky, the controller 180 of the first mobile terminal 100A can understand general characteristics (e.g., wind characteristics, etc.) of the sky.

The controller 180 of the first mobile terminal 100A can transmit a location of each of the objects included in the VR image 2200 and mapping data between characteristics of the respective objects to the second mobile terminal 100B together with the VR image 2200. Depending on an embodiment, if the controller 180 of the first mobile terminal 100A cannot understand which is an object included in the VR image 2200, the controller 180 of the first mobile terminal 100A can understand characteristics (e.g., motion characteristics, weight characteristics, texture characteristics, etc.) of the corresponding object by analyzing a plurality of images used for the VR image 2200 and generation of the VR image 2200.

A user of the second mobile terminal 100B can take a prescribed action for the VR image 2200 watched through the VR device 500. For instance, the user of the second mobile terminal 100B can take an action like touching a prescribed part of the VR image 2200 watched through the VR device 500 with hand.

For instance, the controller 180 of the second mobile terminal 100B activates the camera 121, detects hand of the user of the second mobile terminal 100B included in an image obtained by the activated camera 121, and may then display a graphics 2210 corresponding to a location of the detected hand on the VR image 2200. In another example, the controller 180 of the second mobile terminal 100B receives an image obtained by a camera included in the VR device 500 (or connected to the VR device 500) through the interface unit 160, detects hand of the user of the second mobile terminal 100B included in the received image, and may then display the graphics 2210 corresponding to the location of the detected hand on the VR image 2200.

For a further example, the VR device 500 detects hand of the user of the second mobile terminal 100B included in the image obtained by the camera included in the VR device 500 (or connected to the VR device 500) and then transmits an information corresponding to a location of the detected hand to the second mobile terminal 100B. The controller 180 of the second mobile terminal 100B can display the graphics 2210 corresponding to the location of the detected hand on the VR image 2200 based on the information.

If the graphics 2210 corresponding to the hand of the user of the second mobile terminal 100B is located on the first object 2201 within the VR image 2200, the controller 180 of the second mobile terminal 100B can provide a feedback corresponding to the characteristics of the first object 2201 based on information on the characteristics of the object transmitted from the first mobile terminal 100A. For instance, the controller 180 of the second mobile terminal 100B can output a preset visual effect corresponding to the motion of the wave through the display unit 151 and a preset audio data corresponding to the sound of the wave through the audio output unit 152.

Moreover, if the graphics 2210 corresponding to the hand of the user of the second mobile terminal 100B is located on the second object 2202 within the VR image 2200, the controller 180 of the second mobile terminal 100B can provide a feedback corresponding to the characteristics of the second object 2202 based on the information on the characteristics of the object transmitted from the first mobile terminal 100A. For instance, the controller 180 of the second mobile terminal 100B can not generate any particular visual changes based on strength of the wooden fence as when the user of the second mobile terminal 100B pushes the actual wooden fence.

Furthermore, if the graphics 2210 corresponding to the hand of the user of the second mobile terminal 100B is located on the third object 2203 within the VR image 2200, the controller 180 of the second mobile terminal 100B can provide a feedback corresponding to the characteristics of the third object 2203 based on the information on the characteristics of the object transmitted from the first mobile terminal 100A. For instance, the controller 180 of the second mobile terminal 100B can output a preset audio data corresponding to the sound of the wind through the audio output unit 152 and data corresponding to the feel of the wind as when the user of the second mobile terminal 100B stretches hand out toward the actual sky. In the case of the latter, if an ultrasonic wave output unit is built in the second mobile terminal 100B, the second mobile terminal 100B can output preset data to the user's hand through the ultrasonic wave output unit. And, if an ultrasonic wave output unit is provided to an external device paired (or connected) with the second mobile terminal 100B, the second mobile terminal 100B can output preset data to the external device.

According to the present embodiment, the user of the second mobile terminal 100B can have a feeling as if being actually in a photography scene of the VR image 2200. Meanwhile, according to one embodiment of the present invention, an interaction between the first mobile terminal 100A and the second mobile terminal 100B can be performed during the video call for providing the VR image. It will be described with reference to FIGS. 23 to 27.

Figure 23:
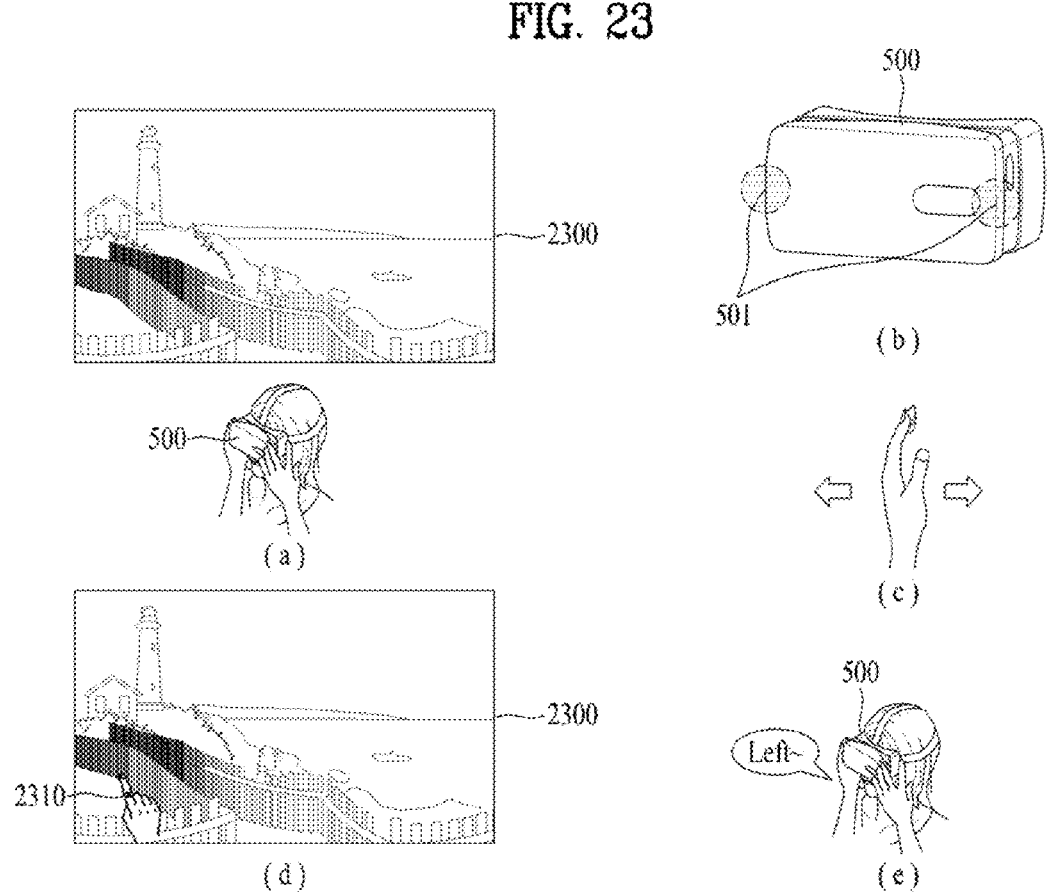
FIG. 23 is a diagram illustrating one example of a method for a user of a second mobile terminal to make a request to a user of a first mobile terminal for what the user of the second mobile terminal desires according to one embodiment of the present invention.

FIG. 23 is a diagram illustrating one example of a method for a user of a second mobile terminal to make a request to a user of a first mobile terminal for what the user of the second mobile terminal desires according to one embodiment of the present invention. Referring to FIG. 23(a), the controller 180 of the second mobile terminal 100B displays a VR image 2300 transmitted from the first mobile terminal 100A. A user of the second mobile terminal 100B can watch the VR image 2300 in a situation of wearing the VR device 500 in which the second mobile terminal 100B is mounted on head. The user of the second mobile terminal 100B can send a preset request to a user of the first mobile terminal 100A. The controller 180 of the second mobile terminal 100B can transmit a signal corresponding to a preset command to the first mobile terminal 100A through the wireless communication unit 110.

FIGS. 23(d) to (d) are diagrams illustrating examples of a method for the user of the second mobile terminal 100B to input the preset command. For example, referring to FIG. 23(b), a touch pad 501 for receiving a touch command of a user may be included in an exterior of the VR device 500. Depending on an embodiment, the VR device 500 may be provided with the touch pad 501 at each of both sides of the VR device 500. For instance, if a user desires to watch a left region in the VR image 2300 as a real-time image, the user can touch the touch pad 501 provided at left side. The VR device 500 may transmit a first signal corresponding to a command received through the touch pad 501 to the second mobile terminal 100B and the controller 180 of the second mobile terminal 100B can transmit a second signal corresponding to the first signal to the first mobile terminal 100A. The second signal includes an information of the region which the user of the second mobile terminal 100B desires to watch in real time.

In another example, referring to FIG. 23(c), the controller 180 of the second mobile terminal 100B activates the camera 121, detects hand of the user of the second mobile terminal included in an image obtained by the activated camera 121, and may then recognize a gesture of the detected hand. Alternatively, the controller 180 of the second mobile terminal 100B receives an image obtained by a camera included in the VR device 500 (or connected to the VR device 500) through the interface unit 160, detects the hand of the user of the second mobile terminal 100B included in the received image, and may then recognize a gesture of the detected hand. The controller 180 of the second mobile terminal 100B can transmit a third signal including a command corresponding to the gesture of the detected hand to the first mobile terminal 100A. The gesture of the detected hand may correspond to a gesture for the user of the second mobile terminal 100B to bend hand to the left. The third signal includes the information of the region which the user of the second mobile terminal 100B desires to watch in real time.

In another example, referring to FIG. 23(d), the controller 180 of the second mobile terminal 100B activates the camera 121, detects hand of the user of the second mobile terminal included in the image obtained by the activated camera 121, and may then display a graphics 2310 corresponding to a location of the detected hand on the VR image 2300. Alternatively, the controller 180 of the second mobile terminal 100B receives an image obtained by a camera included in the VR device 500 (or connected to the VR device 500) through the interface unit 160, detects hand of the user of the second mobile terminal 100B included in the received image, and may then display the graphics 2310 corresponding to the location of the detected hand on the VR image 2300. If the user of the second mobile terminal 100B desires to watch the left region in the VR image 2300, the user of the second mobile terminal 100B can locate the graphics 2310 at the left side in the VR image 2300 by moving the hand. The controller 180 of the second mobile terminal 100B can transmit a fourth signal corresponding to a command input through the graphics 2310 to the first mobile terminal 100A. The fourth signal includes the information of the region which the user of the second mobile terminal 100B desires to watch in real time.

In another example, referring to FIG. 23(e), the controller 180 of the second mobile terminal 100B activates the microphone 122 and may then recognize a voice command by analyzing an audio signal obtained by the activated microphone 122. The controller 180 of the second mobile terminal 100B can transmit a fifth signal corresponding to the recognized voice command to the first mobile terminal 100A. The recognized voice command may correspond to a command for moving the camera 121 of the first mobile terminal 100A to the left. The fifth signal includes the information of the region which the user of the second mobile terminal 100B desires to watch in real time.

Figure 24:
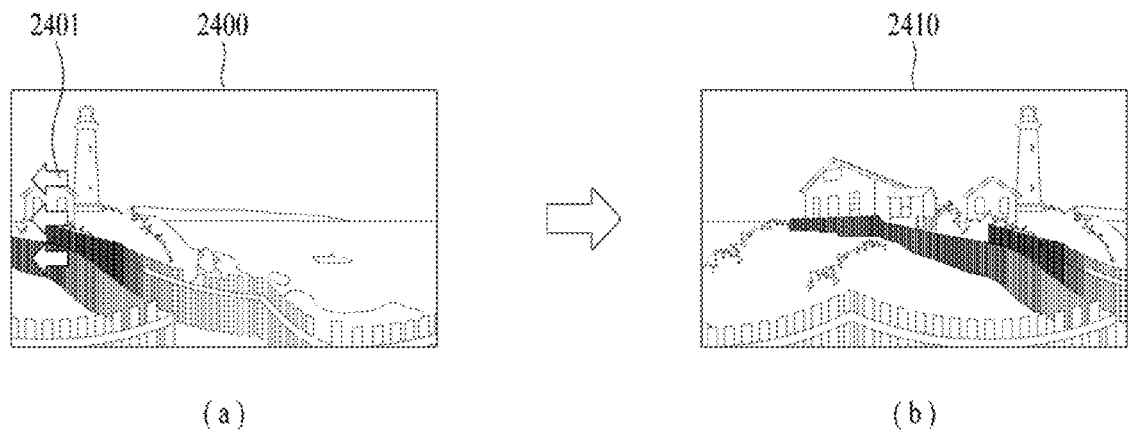
FIG. 24 is a diagram illustrating one example of reception of a prescribed signal from a second mobile terminal by a first mobile terminal as mentioned with reference to FIG. 23, according to one embodiment of the present invention.

FIG. 24 is a diagram illustrating one example of reception of a prescribed signal from a second mobile terminal by a first mobile terminal as mentioned with reference to FIG. 23, according to one embodiment of the present invention. Referring to FIG. 24(a), the controller 180 of the first mobile terminal 100A generates a VR image 2400 using a plurality of images obtained by the camera 121 and may then output at least a part of the generated VR image 2400 to the display unit 151.

The controller 180 of the first mobile terminal 100A can receive a signal corresponding to a command input by a user of the second mobile terminal 100B from the second mobile terminal 100B through the wireless communication unit 110. The signal includes a signal for requesting a movement of the camera 121 in order to obtain an image of a region which the user of the second mobile terminal 100B desires to watch in the VR image 2400 as a real-time image.

The controller 180 of the first mobile terminal 100A can display an indicator 2401 indicating a moving direction of the camera 121 on the display unit 151 in accordance with the signal in order to obtain the image of the region which the user of the second mobile terminal 100B desires to watch in the VR image 2400 as the real-time image.

Referring to FIG. 24(b), a user of the first mobile terminal 100A can photographs images by changing a location (or angle) of the camera 121 in accordance with the direction indicated by the indicator 2401. The controller 180 of the first mobile terminal 100A generates a new VR image 2410 using the existing VR image 2400 and an image obtained by the camera 121, of which the location is changed by the user of the first mobile terminal. And, the controller 180 of the first mobile terminal can transmit the new VR image 2410 to the second mobile terminal 100B through the wireless communication unit 110.

According to one embodiment of the present invention mentioned with reference to FIGS. 23 and 24, the user of the second mobile terminal 100B can make a request for photographing a desired image through an interaction with the user of the first mobile terminal 100A and watch the photographed desired image.

Figure 25:
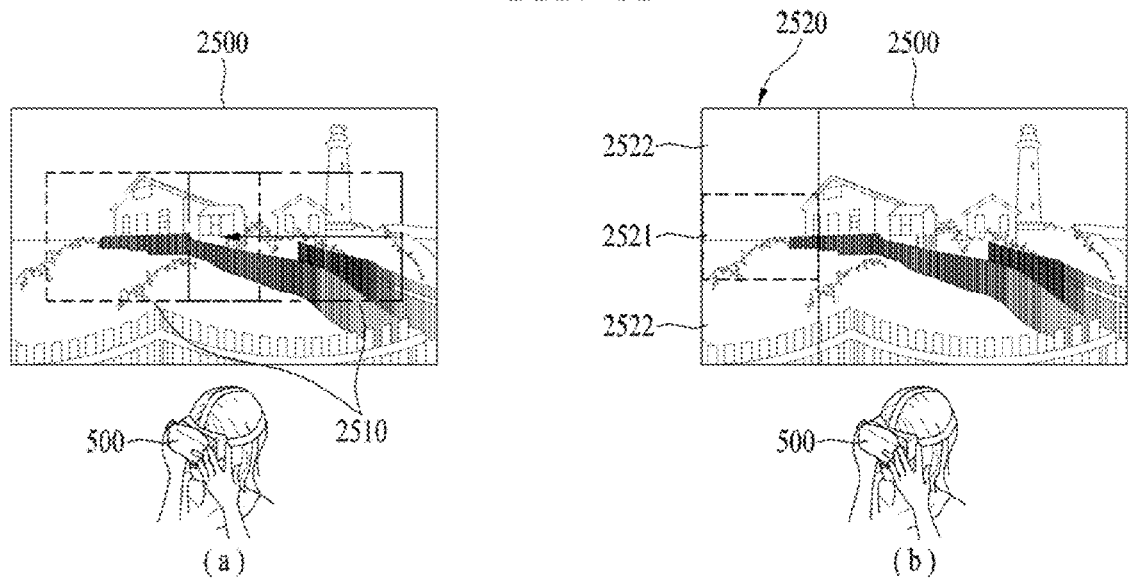
FIG. 25 is a diagram illustrating one example of a screen output to a display unit of a second mobile terminal in case of transmission of a new VR image from a first mobile terminal as mentioned with reference to FIG. 24, according to one embodiment of the present invention.

FIG. 25 is a diagram illustrating one example of a screen output on a display unit of a second mobile terminal in case of transmission of a new VR image from a first mobile terminal as mentioned with reference to FIG. 24, according to one embodiment of the present invention. For example, referring to FIG. 25(a), a user of the second mobile terminal 100B can make a request for changing a region desired to watch as a real-time image within a VR image watched through the VR device 500. Thus, the controller 180 of the second mobile terminal 100B receives a new VR image 2500 of which a region of a dynamic image is changed from the first mobile terminal 100A and may then display the received VR image 2500 on the display unit 151. Therefore, the controller 180 of the second mobile terminal changes a location of an indicator 2510 indicating the dynamic image and may then display the changed location of the indicator 2510 within the VR image 2500. Depending on an embodiment, the indicator 2510 may be utilized as an indicator for indicating a region, which is requested to be additionally photographed by the first mobile terminal.

In another example, referring to FIG. 25(b), the user of the second mobile terminal can make a request for watching a region, which is not included in the VR image watched through the VR device 500, as the real-time image. Thus, the controller 180 of the second mobile terminal receives the VR image 2500 including a new image obtained by the camera 121 as the dynamic image from the first mobile terminal and may then display the received VR image 2500 on the display unit 151. The VR image 2500 includes at least a part of the existing VR image and a new image 2520 obtained by the camera 121 of the first mobile terminal 100A. The image 2520 includes a dynamic image 2521 newly obtained by the camera 121 of the first mobile terminal 100A. Each of regions 2522 resulting from excluding the dynamic image 2521 from the image 2520 may correspond to a static image generated by matching images obtained by the camera 121 of the first mobile terminal 100A as mentioned with reference FIGS. 12 to 15. Alternatively, the region 1922 may correspond to a complemented image as mentioned with reference to FIG. 19.

Figure 26:
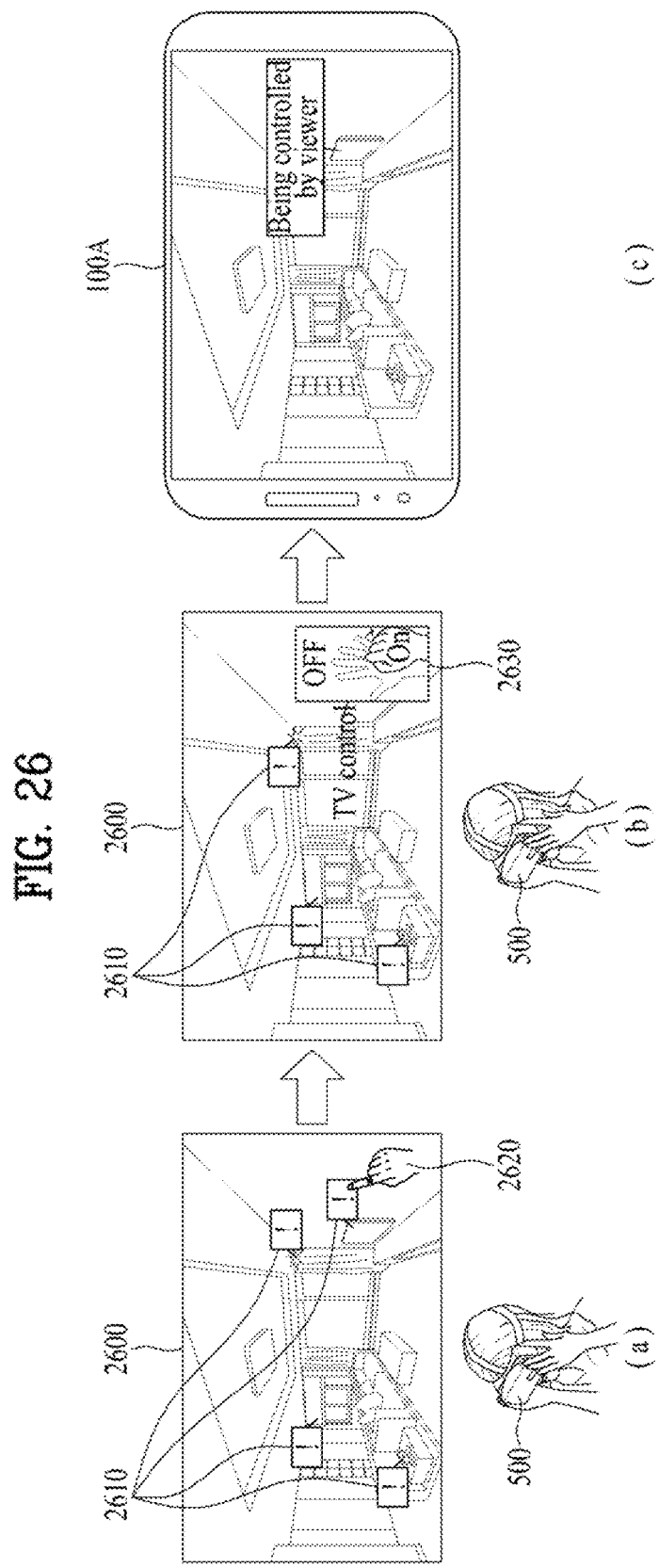
FIG. 26 is a diagram illustrating one example of a method for a user of a second mobile terminal to control a specific object included in a VR image according to one embodiment of the present invention.

FIG. 26 is a diagram illustrating one example of a method for a user of a second mobile terminal to control a specific object included in a VR image according to one embodiment of the present invention. Referring to FIG. 26(a), the controller of the second mobile terminal 100B can display a VR image 2600 transmitted from the first mobile terminal 100A on the display unit 151. The controller 180 of the second mobile terminal 100B can enter a control mode of the VR image 2600 in accordance with a preset command. If a controllable specific object is included in the VR image 2600, the controller 180 of the second mobile terminal 100B can enter a mode for enabling the specific object included in the VR image 2600 to be controlled in accordance with the preset command. For instance, the preset command may correspond to a command received in a similar manner as mentioned with reference to FIGS. 23 (b) to (e). And, the preset command may corresponds to a command for sensing eyes of the user of the second mobile terminal 100B wearing the VR device 500 fixed on a prescribed region within the VR image 2600 for more than a preset time.

If entering the control mode of the VR image 2600, the controller 180 of the second mobile terminal can display an indicator 2610 indicating the controllable specific object in the VR image 2600 on the VR image 2600. And, the controller 180 of the second mobile terminal can display a graphics 2620 corresponding to hand of the user of the second mobile terminal 100B on the VR image 2600.

In receiving the VR image 2600 from the first mobile terminal 100A or in accordance with the command for entering the control mode of the VR image 2600, the controller 180 of the second mobile terminal 100B can receive an additional information for controlling the specific object from the first mobile terminal 100A.

The controller 180 of the first mobile terminal 100A analyzes the VR image 2600 in generating the VR image 2600. The controller 180 of the first mobile terminal 100A can generate the additional information for controlling the specific object when the specific object is included in the analyzed VR image 2600. For instance, the memory 170 of the first mobile terminal 100A includes information on appliances paired with the first mobile terminal 100A. And, the first mobile terminal 100A can receive information on appliances from a separate control device connected to the appliances through a home network. In this instance, information on appliances includes a location information of each of appliances, information on a controllable function of each of appliances and the like.

The controller 180 of the first mobile terminal 100A detects whether the specific object corresponding to a controllable appliance is included in the generated VR image 2600 based on the information on the appliances. If the specific object corresponding to the controllable appliance is included in the VR image 2600, the controller 180 of the first mobile terminal 100A can generate an additional information for controlling the specific object based on the information on the appliances.

For instance, the additional information includes an ID information of the specific object in the VR image 2600, an information on a location of the specific object in the VR image 2600, an information on a command for controlling a function of the specific object in the VR image 2600, and the like. If controlling a specific object corresponding to TV of objects included in the VR image 2600, the controller 180 of the second mobile terminal 100B can locate the graphics 2620 on the indicator 2610 indicating the specific object corresponding to the TV.

Referring to FIG. 26(b), the controller 180 of the second mobile terminal 100B can display a guide information 2630 indicating a method of controlling the function of the specific object on the VR image 2600 based on the additional information for controlling the specific object. For instance, the guide information 2630 includes an information on a gesture command that should be input by the user of the second mobile terminal 100B in order to turn TV on/off.

The user of the second mobile terminal 100B can take a gesture for controlling a specific function of the TV based on the guide information 2630. The controller 180 of the second mobile terminal 100B recognizes the gesture included in the image obtained by the camera 121 and may then transmit a signal (i.e., signal for controlling the function of the specific object) corresponding to the recognized gesture to the first mobile terminal 100A. For instance, the gesture may correspond to a gesture of closing or opening the hand, a gesture of raising or lowering the hand, a gesture of moving the hand toward a preset direction with the opened palm, a gesture of pushing a prescribed region with the fingers, a gesture of bending or spreading out the prescribed number of the fingers, a gesture similar to a motion for controlling an actual electronic device corresponding to a specific object, or the like.

Referring to FIG. 26(c), the controller 180 of the first mobile terminal 100A can run a function corresponding to the specific object based on the signal transmitted from the second mobile terminal 100B. For instance, the controller 180 of the first mobile terminal 100A can transmit a command for running the function corresponding to the specific object to the TV (electronic device becoming a control target such as TV, lamp, fan, radio, boiler or refrigerator depending on an embodiment) corresponding to the specific object and the control device. And, the controller 180 of the first mobile terminal 100A can display an indicator 2640 indicating that the function of the TV corresponding to the specific object is controlled by the user of the second mobile terminal 100B on the display unit 151.

Depending on an embodiment, when the function of the TV corresponding to the specific object is controlled, the controller 180 of the second mobile terminal outputs audio data corresponding to the function of the TV through the audio output unit 152, whereby the controller 180 of the second mobile terminal can enable the user of the second mobile terminal 100B to feel sense of reality.

Figure 27:
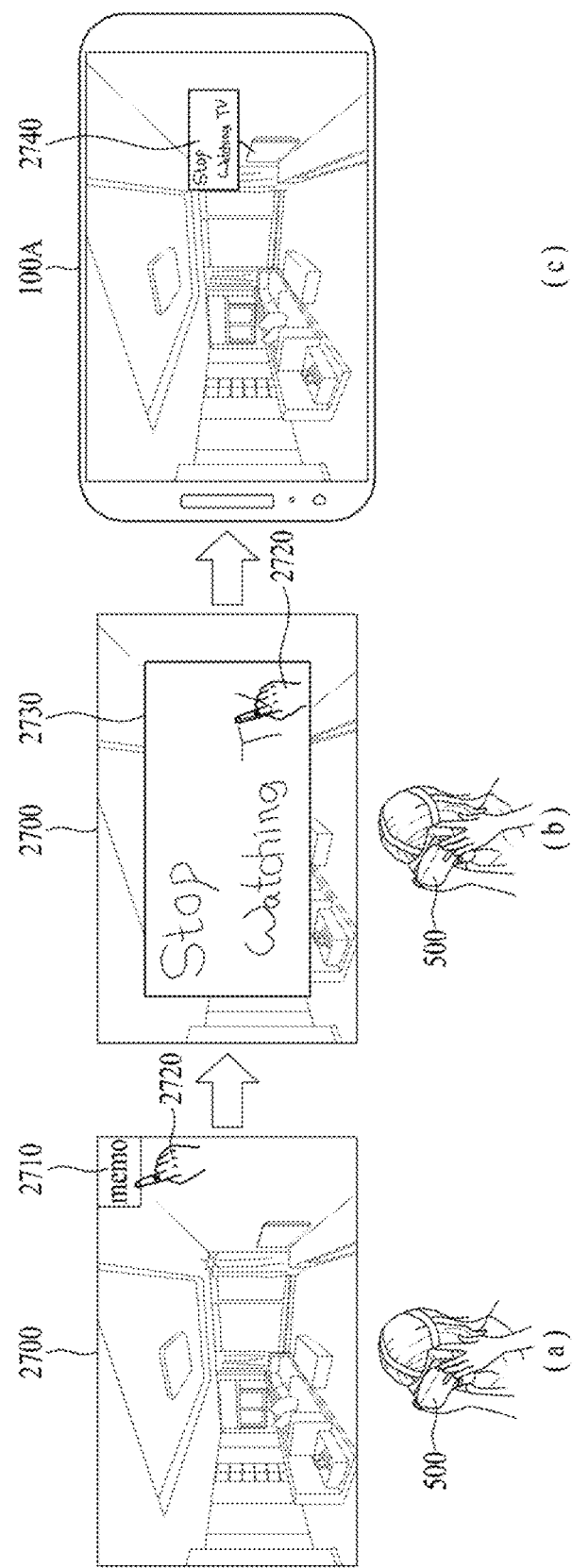
FIG. 27 is a diagram illustrating one example of a method for a user of a second mobile terminal to control a VR image according to one embodiment of the present invention.

FIG. 27 is a diagram illustrating one example of a method for a user of a second mobile terminal to control a VR image according to one embodiment of the present invention. Referring to FIG. 27(a), the controller 180 of the second mobile terminal 100B can output a VR image 2700 transmitted from the first mobile terminal 100A to the display unit 151. The VR image 2700 includes a menu option 2710 corresponding to a function capable of adding a prescribed memo to the VR image 2700.

The controller 180 of the second mobile terminal 100B can display a graphics 2720 corresponding to hand of the user of the second mobile terminal 100B on the VR image 2700. A user of the second mobile terminal 100B locates the graphics 2720 on the menu option 2710 by moving the hand and can then select the menu option 2710. Depending on an embodiment, the user of the second mobile terminal 100B can specify an object, on which the user of the second mobile terminal 100B desires to leave a memo, of objects included in the VR image 2700.

Referring to FIG. 27(b), the controller 180 of the second mobile terminal 100B can output GUI (graphic user interface) 2730 enabling the user of the second mobile terminal to input the prescribed memo to the VR image 2700 in accordance with a command for selecting the menu option 2710. The user of the second mobile terminal 100B can input the prescribed memo through the GUI 2710 using the graphics 2720 by moving the hand. The controller 180 of the second mobile terminal 100B can transmit a signal including a content of the memo input through the GUI 2710 to the first mobile terminal 100A.

Referring to FIG. 27(c), the controller 180 of the first mobile terminal 100A can display an indicator 2740 including the content of the memo on the display unit 151 based on the signal transmitted from the second mobile terminal 100B. Depending on an embodiment, if a user of the first mobile terminal 100A specifies an object on which the user of the first mobile terminal 100A desires to leave a memo in FIG. 27(a), the controller 180 of the first mobile terminal 100A can display the indicator 2740 on a region corresponding to the specific object in an image corresponding to at least a part of the VR image output to the display unit 151.

Figure 28:
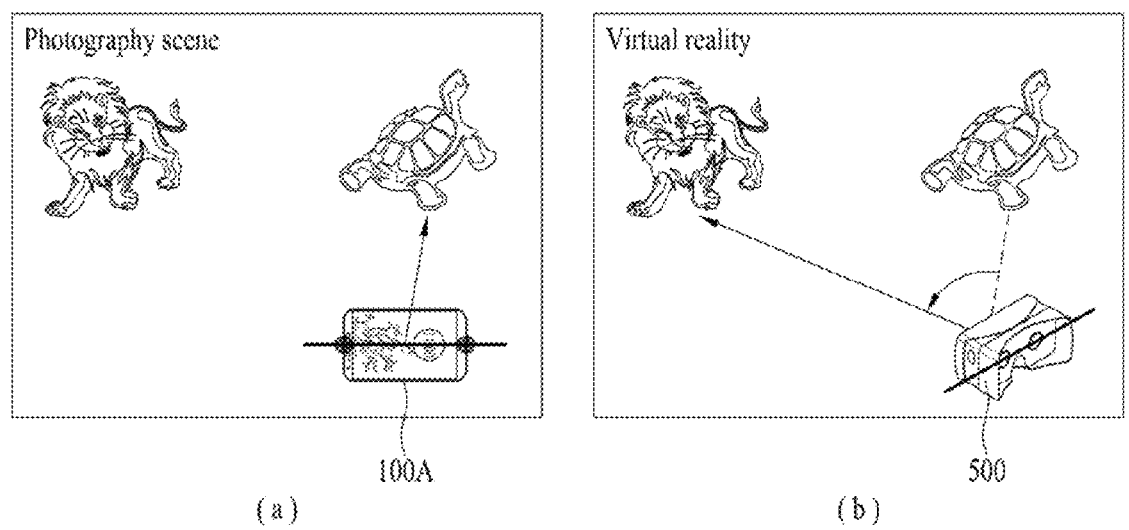
FIG. 28 is a diagram illustrating one example of a method for a second mobile terminal to output audio data during a video call for providing a VR image according to one embodiment of the present invention.

FIG. 28 is a diagram illustrating one example of a method for a second mobile terminal to output audio data during a video call for providing a VR image according to one embodiment of the present invention. Referring to FIG. 28(a), the controller 180 of the first mobile terminal 100A activates the microphone 122 in a video call for proving a VR image. The activated microphone 122 receives an external sound signal and may then convert the received external sound signal into an electrical voice signal. The first mobile terminal 100A includes at least two or more microphones 122.

When obtaining voice signals through the microphones 122, the controller 180 of the first mobile terminal 100A can understand from which side a specific voice signal included in the voice signals is obtained based on strength, waveform and the like of the voice signals. And, when obtaining voice signals through the microphones 122, the controller 180 of the first mobile terminal 100A can sense to which the first mobile terminal faces.

The controller 180 of the first mobile terminal 100A can transmit a voice signal corresponding to the VR image as well as the VR image to the second mobile terminal 100B in the video call for providing the VR image with the second mobile terminal 100B.

Referring to FIG. 28(b), when outputting the VR image transmitted from the first mobile terminal 100A to the display unit 151, the second mobile terminal 100B can output the voice signal corresponding to the VR image through the audio output unit 152. In this instance, the second mobile terminal 100B can determine to which side in the VR image a user wearing the VR device 500 faces. For instance, the second mobile terminal 100B can detect head motion of the user of the second mobile terminal by detecting motion of the VR device 500 connected to the second mobile terminal 100B based on data sensed through the sensing unit 140. And, the second mobile terminal 100B can detect the head motion of the user of the second mobile terminal 100B and/or motion of eyes of the user of the second mobile terminal 100B based on data transmitted from the VR device 500.

The controller 180 of the second mobile terminal 100B emphasizes a voice signal corresponding to a side to which the user of the second mobile terminal 100B faces, among voice signals transmitted from the first mobile terminal 100A and may then output the emphasized voice signal through the audio output unit 152. For instance, the controller 180 of the second mobile terminal can process the transmitted voice signal using a beamforming technology. For example, the controller 180 of the second mobile terminal 100B can output only the voice signal corresponding to the side to which the user of the second mobile terminal 100B faces among the voice signals transmitted from the first mobile terminal 100A through the audio output unit 152. In another example, when a voice signal is obtained by the first mobile terminal 100A, the controller 180 of the second mobile terminal 100B converts the voice signal based on a side to which the first mobile terminal 100A faces with reference to a side to which the user of the second mobile terminal faces and may then display the converted voice signal through the audio output unit 152.

Figure 29:
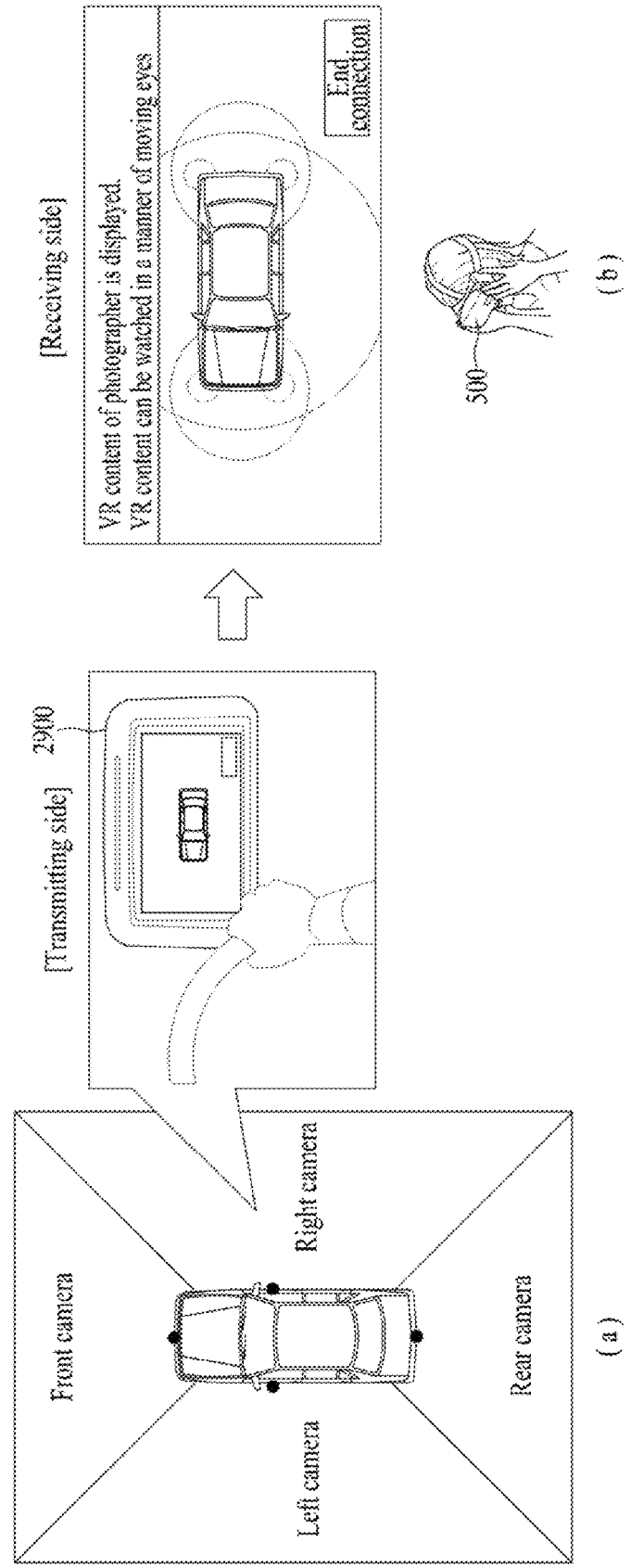
FIG. 29 is a diagram illustrating one example of a method for generating a VR image using a camera mounted on a vehicle according to one embodiment of the present invention.

FIG. 29 is a diagram illustrating one example of a method for generating a VR image using a camera mounted on a vehicle according to one embodiment of the present invention. Referring to FIG. 29(a), at least two cameras of a front camera, a rear camera, a left camera and a right camera are included in a vehicle. And, an electronic device 2900 for receiving images obtained by the cameras of the vehicle exists inside or outside the vehicle.

The electronic device 2900 may correspond to a mobile terminal belonging to an owner of the vehicle or a navigation device provided within the vehicle. The electronic device 2900 receives a plurality of the images obtained by the cameras of the vehicle and may then generate a VR image by matching the received images. Since a method of generating a VR image is similar to the method mentioned with reference to FIGS. 6 to 10 and FIG. 19, the detailed description is omitted.

The electronic device 2900 may transmit a signal for requesting a communication connection to provide a VR image to the second mobile terminal 100B. The signal for requesting the communication connection to provide the VR image may correspond to the signal for requesting the video call to provide the VR image or the signal for requesting a separate communication connection except the video call to provide the VR image, which is mentioned in the foregoing description. And, the electronic device 2900 may transmit the generated VR image to the second mobile terminal 100B.

The second mobile terminal 100B receives the signal and a user of the second mobile terminal can watch the VR image through the VR device 500 after wearing the VR device 500 to which the second mobile terminal is connected. In the present embodiment, since other processes are similar to those mentioned with reference to FIGS. 5 to 28, the detailed description is omitted.

Figure 30:
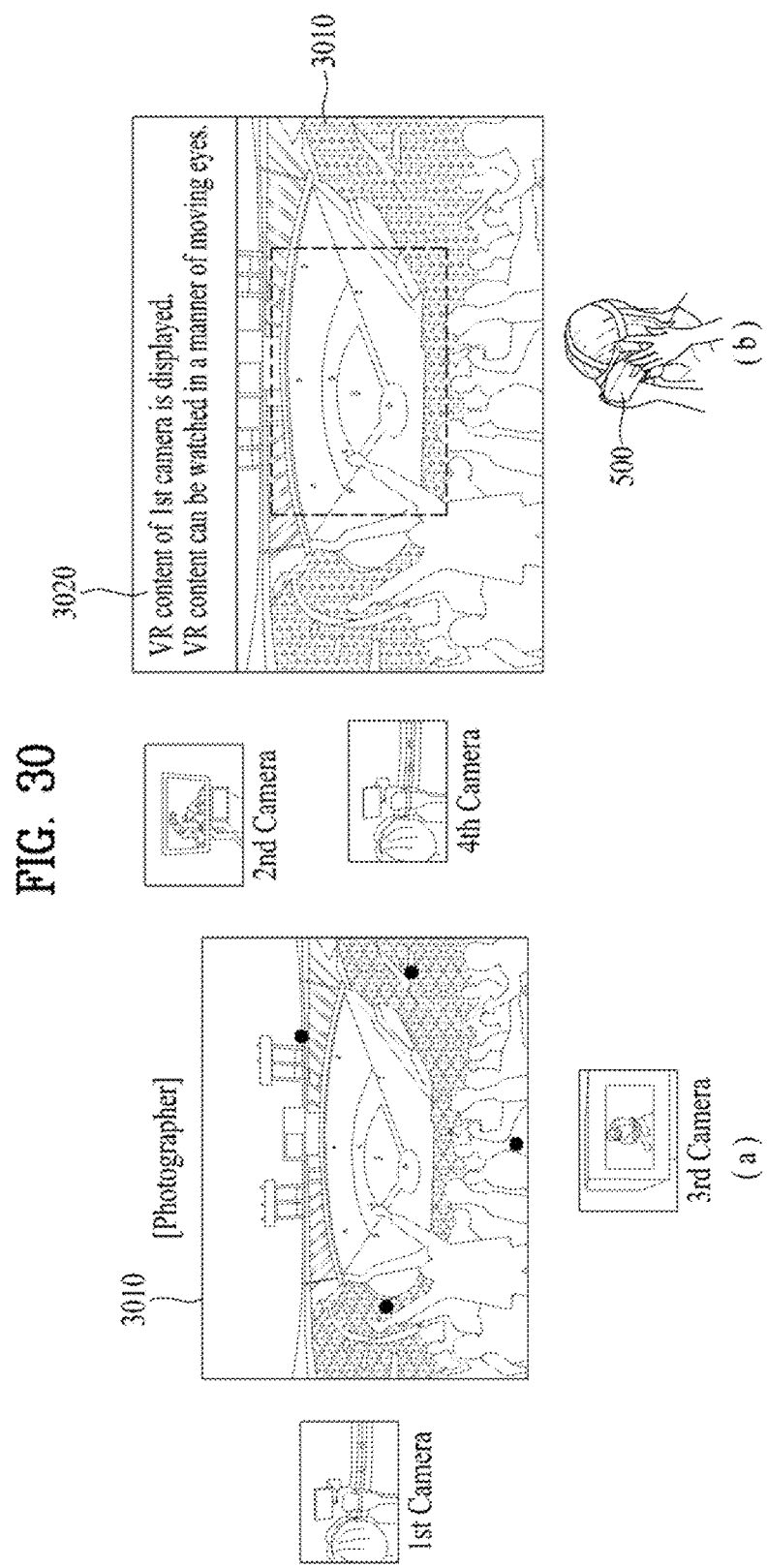
FIG. 30 is a diagram illustrating another example of a method for generating a VR image according to one embodiment of the present invention.

FIG. 30 is a diagram illustrating another example of a method for generating a VR image according to one embodiment of the present invention. Referring to FIG. 30(a), a plurality of cameras are placed at a photography scene. In the present embodiment, assume that a first to fourth cameras exist at the photography scene.

The first mobile terminal 100A can receives images from four cameras. In this instance, an image having an angle of view equal to or greater than a preset degree used for generating a VR image may be photographed through each of the first to fourth cameras. Alternatively, each of the first to fourth cameras may generate the image having the angle of view equal to or greater than a preset degree by changing a location (or angle) of each of the cameras in a similar way as mentioned with reference to FIGS. 12 to 15.

The controller 180 of the first mobile terminal 100A transmits a signal for requesting a communication connection to provide the VR image to the second mobile terminal 100B. If a signal for granting the communication connection is received from the second mobile terminal 100B, the controller 180 of the first mobile terminal 100A can transmit a VR image 3010 to the second mobile terminal 100B. The VR image 3010 transmitted to the second mobile terminal can correspond to an image obtained by a specific camera among the first to fourth cameras. For instance, the VR image 3010 transmitted to the second mobile terminal 100B can corresponds to an image obtained by a camera preset as a main camera among the first to fourth cameras.

Referring to FIG. 30(b), the controller 180 of the second mobile terminal 100B outputs the VR image 3010 to the display unit 151 and a user of the second mobile terminal 100B can watch the VR image 3010 in a situation of wearing the VR device 500 to which the second mobile terminal 100B is connected on head. The VR image 3010 includes an information 3020 indicating by which camera among the first to fourth camera the VR image 3010 is generated.

Meanwhile, according to one embodiment of the present invention, the user of the second mobile terminal 100B selects a VR image generated by a desired camera among the first to fourth cameras and may then watch the selected VR image. It will be described with reference to FIGS. 31 and 32.

Figure 31:
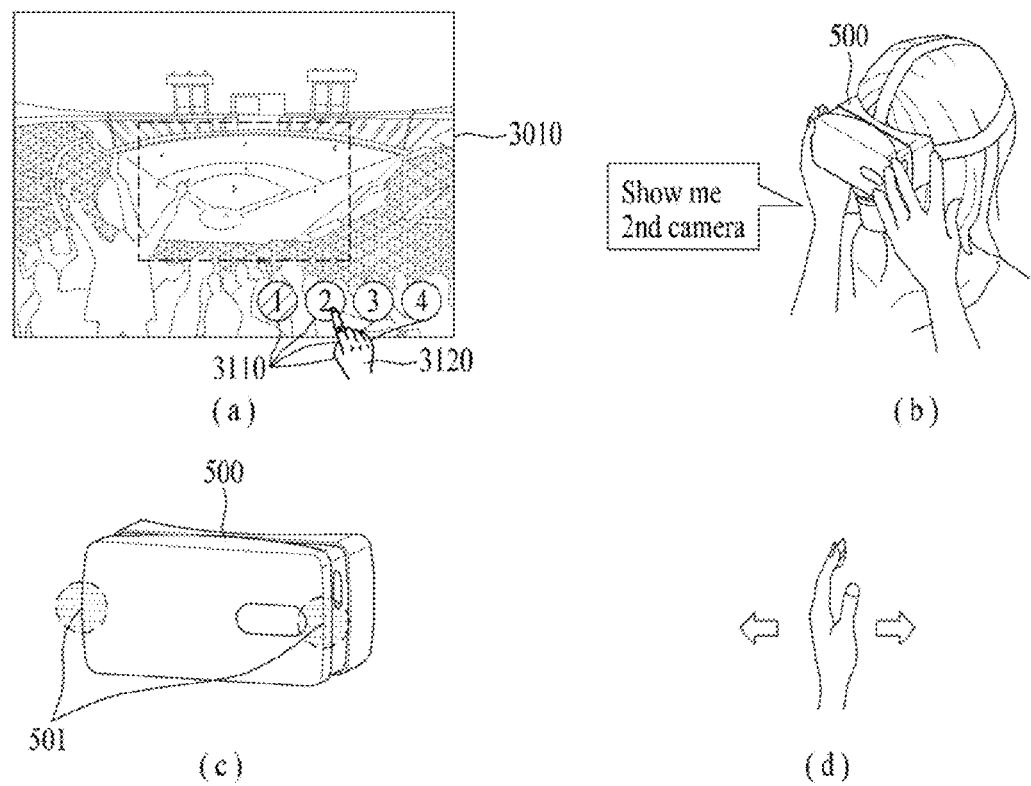
FIG. 31 is a diagram illustrating one example of a method for a user of a second mobile terminal to select a VR image of a desired camera according to one embodiment of the present invention.

FIG. 31 is a diagram illustrating one example of a method for a user of a second mobile terminal to select a VR image of a desired camera according to one embodiment of the present invention. Referring to FIG. 31(a), the VR image 3010 output to the display unit 151 of the second mobile terminal 100B includes indicators 3110 corresponding to the respective first to fourth cameras interconnected to the first mobile terminal 100A. And, an indicator of the third camera, which corresponds to the current VR image 3010, among the indicators 3110 may be displayed by being distinguished from the rest of the indicators.

The controller 180 of the second mobile terminal 100B activates the camera 121, detects hand of the user of the second mobile terminal included in an image obtained by the activated camera 121, and may then display a graphics 3120 corresponding to a location of the detected hand on the VR image 3010. Alternatively, the controller 180 of the second mobile terminal 100B receives an image obtained by a camera included in the VR device 500 (or connected to the VR device 500) through the interface unit 160, detects hand of the user of the second mobile terminal 100B included in the received image, and may then display the graphics 3120 corresponding to the location of the detected hand on the VR image 3010. The user of the second mobile terminal 100B can select a desired camera for watching a VR image from the first to fourth cameras by selecting a specific indicator 3110 using the graphics 3120. And, the controller 180 of the second mobile terminal 100B can transmit a signal for requesting the VR image of a specific camera selected by the user to the first mobile terminal 100A.

Referring to FIG. 31(b), the controller 180 of the second mobile terminal 100B activates the microphone 122 and may recognize a voice command by analyzing an audio signal obtained by the activated microphone 122. The controller 180 of the second mobile terminal 100B can transmit a signal corresponding to the recognized voice command to the first mobile terminal 100A. The recognized voice command may correspond to a command for selecting the desired camera for watching the VR image from the first to fourth cameras.

Referring to FIG. 31(c), the touch pad 501 for receiving a touch command of the user may be included in an exterior of the VR device 500. For instance, the user of the second mobile terminal 100B can input a user command by touching the touch pad 501 as many times as a desired camera number.

Referring to FIG. 31(d), the controller 180 of the second mobile terminal 100B activated the camera 121, detects hand of the user of the second mobile terminal included in an image obtained by the activated camera 121, and may then recognize a gesture of the detected hand. Alternatively, the controller 180 of the second mobile terminal 100B receives an image obtained by a camera included in the VR device 500 (or connected to the VR device 500) through the interface unit 160, detects the hand of the user of the second mobile terminal 100B included in the received image, and may then recognize a gesture of the detected hand. The controller 180 of the second mobile terminal 100B can transmit a signal including a command corresponding to the gesture of the detected hand to the first mobile terminal 100A. The command corresponding to the gesture may be a command corresponding to a preset gesture for indicating a specific camera.

Figure 32:
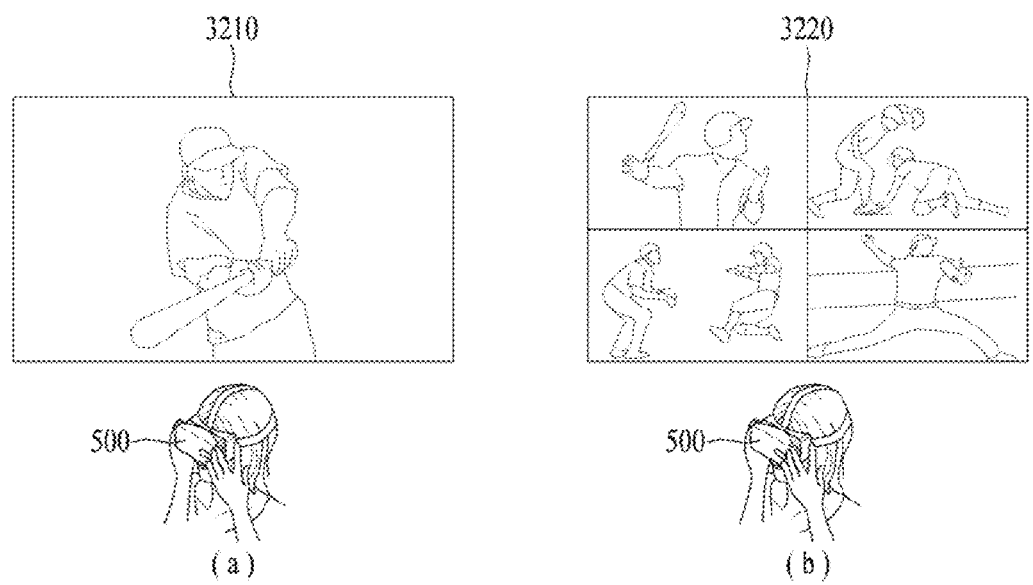
FIG. 32 is a diagram illustrating one example of a method for outputting a VR image generated by a specific camera in case of the specific camera selected by a user of a second mobile terminal as mentioned with reference to FIG. 31, according to one embodiment of the present invention.

FIG. 32 is a diagram illustrating one example of a method for outputting a VR image generated by a specific camera in case of the specific camera selected by a user of a second mobile terminal as mentioned with reference to FIG. 31, according to one embodiment of the present invention. Referring to FIG. 32(a), the controller 180 of the first mobile terminal 100A can transmit a VR image obtained by a second camera to the second mobile terminal 100B in accordance with a user command for selecting the second camera. And, the controller 180 of the second mobile terminal 100B can output a VR image 3210 obtained by the second camera to the display unit 151.

Referring to FIG. 32(b), a user of the second mobile terminal 100B can select a plurality of cameras. The controller 180 of the first mobile terminal 100A can transmit images (or an image resulting from synthesizing these images) 3220 obtained by respective first to fourth cameras to the second mobile terminal 100B in accordance with a user command for selecting all of the first to fourth cameras. In the present embodiment, each of the images 3220 may not correspond to a VR image. The controller 180 of the second mobile terminal 100B can output the images 3220 to the display unit 151.

Figure 33:
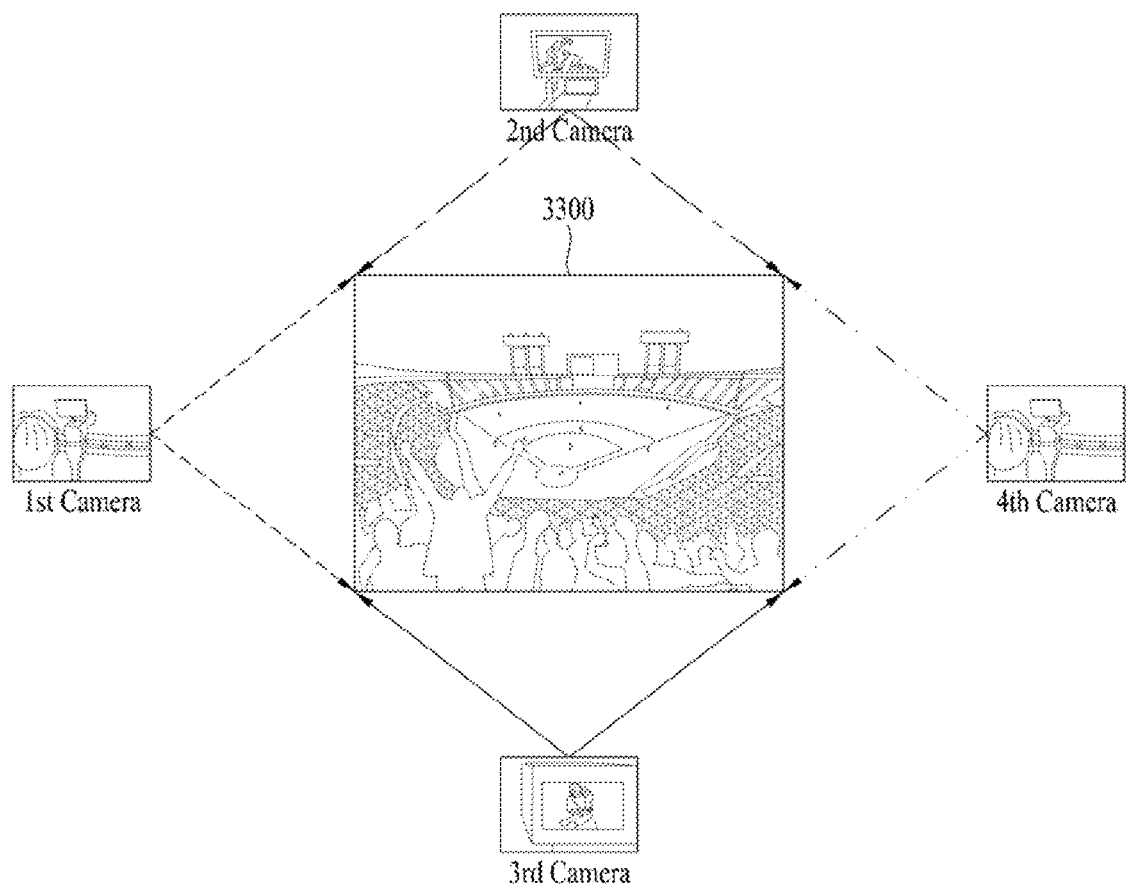
FIG. 33 is a diagram illustrating another example of a method for generating a VR image according to one embodiment of the present invention. And, the redundant contents mentioned with reference to FIG. 31 shall be omitted.

FIG. 33 is a diagram illustrating another example of a method for generating a VR image according to one embodiment of the present invention. And, the redundant contents mentioned with reference to FIG. 31 shall be omitted. According to the present embodiment, a plurality of cameras are placed at a photography scene. For instance, assume that first and fourth cameras exist.

The controller 180 of the first mobile terminal 100A can generate a VR image 3300 by matching images received from four cameras with each other. The controller 180 of the first mobile terminal 100A can generate the VR image 3300 by matching a plurality of images with each other through edge analysis, color analysis and the like between objects identical to each other included in images received from four cameras and may then transmit the generated VR image 3300 to the second mobile terminal 100B.

Accordingly, embodiments of the present invention provide various advantages. According to at least one of embodiments of the present invention, a solution for a user of a mobile terminal to easily make a VR content can be provided. According to at least one of embodiments of the present invention, a solution for enabling an interaction between a transmitting side making and transmitting a VR content and a receiving side receiving and watching the VR content can be provided.

It will be appreciated by those skilled in the art that the present invention can be specified into other form(s) without departing from the spirit or scope of the inventions. In addition, the above-described methods can be implemented in a program recorded medium as computer-readable codes. The computer-readable media includes all kinds of recording devices in which data readable by a computer system are stored. The computer-readable media includes ROM, RAM, CD-ROM, magnetic tapes, floppy discs, optical data storage devices, and the like for example and also include carrier-wave type implementations (e.g., transmission via Internet). Further, the computer includes the controller 180 of the terminal. The controller 180, wireless communication unit 110 and other components shown in FIG. 1A have sufficient structure (e.g., a processing chip) for executing the appropriate algorithms (flowcharts) to perform the described functions.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a camera;
   a display;
   a wireless communication unit; and
   a controller configured to:
   control the wireless communication unit to transmit a first signal requesting a video call to provide a virtual reality (VR) image to an external device, the VR image having an angle of view equal to or greater than a preset degree, wherein the VR image comprises a dynamic image obtained by real time by the camera and a static image pre-obtained by the camera, and wherein the dynamic image is processed to have a preset depth perceived by a user,
   generate the VR image based on a plurality of images obtained using the camera,
   control the wireless communication unit to receive a preset second signal from the external device, and
   control the wireless communication unit to transmit a third signal including the generated VR image to the external device in response to the second signal.

2. The mobile terminal of claim 1, wherein the controller is further configured to display a guide user interface (UI) for guiding a method of obtaining the plurality of the images on the display, and the guide UI comprises an indicator indicating a direction the camera should be moved to obtain the plurality of the images.

3. The mobile terminal of claim 1, wherein the preset degree is greater than an angle of view of the camera.

4. The mobile terminal of claim 1, wherein the controller is further configured to display a first screen corresponding to a user of the external device in a launch screen of a contact application on the display, and
   wherein the first screen comprises a first menu option for requesting a voice call to the external device, a second menu option for requesting the video call to the external device, a third menu option for transmitting a text message to the external device and a fourth menu option for requesting the video call to provide the VR image to the external device.

5. The mobile terminal of claim 1, wherein the controller is further configured to display the dynamic image in the VR image on the display.

6. The mobile terminal of claim 5, wherein the controller is further configured to output additional information corresponding to the VR image to the dynamic image, and
   wherein the additional information comprises an indicator for indicating a location of the dynamic image in the VR image.

7. The mobile terminal of claim 6, wherein the controller is further configured to:
   control the wireless communication unit to receive from the external device a fourth signal including information of a region, which is viewed by the user of the external device, in the VR image transmitted to the external device, and
   display the indicator for indicating the region, which is viewed by the user of the external device, in the VR image on the additional information based on the fourth signal.

8. The mobile terminal of claim 6, wherein the controller is further configured to:
   control the wireless communication unit to receive from the external device a fifth signal including information of a region desired to be viewed as a real-time image by the user of the external device, and
   display an indicator indicating a direction the camera should be moved on the display in order to obtain an image of the region desired to be viewed as the real-time image by the user of the external device based on the fifth signal.

9. The mobile terminal of claim 1, wherein the controller is further configured to:
   display the VR image on the display, and
   display an indicator on the VR image indicating the dynamic image in the VR image.

10. The mobile terminal of claim 8, wherein the controller is further configured to:
    control the wireless communication unit to receive from the external device a sixth signal for controlling a specific object within the VR image transmitted to the external device, and
    execute a function corresponding to the specific object within the VR image.

11. The mobile terminal of claim 1, wherein the second signal comprises information indicating that the external device has been connected to a VR device, and
    wherein the controller is further configured to display a notification message notifying that the external device has been connected to the VR device on the display in accordance with the second signal.

12. A mobile terminal, comprising:
    a wireless communication unit;
    a display; and
    a controller configured to:
    control the wireless communication unit to receive a first signal requesting a video call to provide a virtual reality (VR) image from an external device, the VR image having an angle of view equal to or greater than a preset degree, control the wireless communication unit to transmit a third signal granting the video call to provide the VR image in response to a second signal indicating a connection between the mobile terminal and a VR device, control the wireless communication unit to receive a fourth signal including the VR image from the external device, and display the VR image included in the fourth signal on the display.

13. The mobile terminal of claim 12, further comprising:
an interface unit configured to connect the mobile terminal and the VR device to each other,
wherein the second signal is detected as the VR device is connected to the interface unit.

14. The mobile terminal of claim 12, wherein the VR image comprises a dynamic image obtained by real time by a camera of the external device and a static image pre-obtained by the camera of the external device, and
wherein the dynamic image is processed to have a preset depth perceived by a user.

15. The mobile terminal of claim 14, wherein the controller is further configured to display an indicator indicating the dynamic image in the VR image on the VR image.

16. The mobile terminal of claim 12, wherein the controller is further configured to output a guide message guiding a user to wear the VR device to the display if the first signal is received.

17. The mobile terminal of claim 13, wherein the controller is further configured to:

receive at least one of a motion information of the VR device, a tilt information of the VR device, an eye information of a user of the mobile terminal and a user command information of the mobile terminal from the VR device through the interface unit, and control the wireless communication unit to transmit a fifth signal including at least one of the information received through the interface unit to the external device.

18. The mobile terminal of claim 12, wherein the fourth signal further comprises audio data corresponding to the VR image, and wherein the controller is further configured to detect a region, which is viewed by a user of the mobile terminal, in the VR image based on an information received through an interface unit, process the audio data based on the detected region, and output the processed audio data through an audio output unit.

19. The mobile terminal of claim 15, wherein if the VR image includes a specific object corresponding a control target, the fourth signal further includes information of the specific object, and wherein the controller is further configured to display the indicator on the VR image indicating the specific object within the VR image based on the information of the specific object.

* * * * *